United States Patent
Bassi et al.

(10) Patent No.: US 8,442,316 B2
(45) Date of Patent: May 14, 2013

(54) SYSTEM AND METHOD FOR IMPROVING COLOR AND BRIGHTNESS UNIFORMITY OF BACKLIT LCD DISPLAYS

(75) Inventors: Zorawar S. Bassi, Markham (CA); Ashkan Alavi-Harati, Richmond Hill (CA)

(73) Assignee: Geo Semiconductor Inc., Toronto (CA)

( * ) Notice: Subject to any disclaimer, the term of this patent is extended or adjusted under 35 U.S.C. 154(b) by 203 days.

(21) Appl. No.: 13/098,221

(22) Filed: Apr. 29, 2011

(65) Prior Publication Data

US 2011/0285763 A1 Nov. 24, 2011

Related U.S. Application Data

(63) Continuation-in-part of application No. 11/649,765, filed on Jan. 5, 2007, now Pat. No. 8,055,070.

(51) Int. Cl.
*G06K 9/00* (2006.01)
*G09G 3/20* (2006.01)

(52) U.S. Cl.
USPC .............................. 382/167; 382/162; 345/55

(58) Field of Classification Search .................... None
See application file for complete search history.

(56) References Cited

U.S. PATENT DOCUMENTS

| | | | |
|---|---|---|---|
| 4,472,732 A | 9/1984 | Bennett et al. |
| 4,635,532 A | 1/1987 | Tanino et al. |
| 4,908,874 A | 3/1990 | Gabriel |
| 4,975,976 A | 12/1990 | Kimata et al. |
| 5,175,808 A | 12/1992 | Sayre |
| 5,204,944 A | 4/1993 | Wolberg et al. |
| 5,335,097 A | 8/1994 | Murakami |
| 5,452,019 A | 9/1995 | Fukuda et al. |
| 5,594,676 A | 1/1997 | Greggain et al. |
| 5,808,623 A | 9/1998 | Hamburg |
| 5,848,199 A | 12/1998 | Naqvi |
| 6,005,582 A | 12/1999 | Gabriel et al. |
| 6,016,152 A | 1/2000 | Dickie |
| 6,061,477 A | 5/2000 | Lohmeyer et al. |

(Continued)

FOREIGN PATENT DOCUMENTS

| | | |
|---|---|---|
| EP | 0920671 B1 | 6/1997 |
| EP | 1534019 A2 | 5/2005 |
| WO | 97/39420 | 10/1997 |

OTHER PUBLICATIONS

Zwicker, M. et al., "EWA Splatting", IEEE Transactions on Visualization and Computer Graphics, vol. 8, No. 3, Jul. to Sep. 2002, pp. 223-238.

(Continued)

*Primary Examiner* — Li Liu
(74) *Attorney, Agent, or Firm* — Sughrue Mion, PLLC

(57) ABSTRACT

Systems and methods for improving color and brightness uniformity of an image displayed on a backlit LCD are disclosed. In one example, a correction map is computed and applied to the LCD pixel values. In another example, the voltage settings of the backlight source components are also corrected in addition to the LCD pixel values. For efficient hardware implementation, corrections are applied using function representation of a grid data transformation relating measured values to corrected values. In one particular exemplary embodiment, the backlight source is provided by a plurality of LEDs. In another exemplary embodiment, the display consists of a plurality of OLEDs wherein the light source and the display panels coincide.

38 Claims, 25 Drawing Sheets

U.S. PATENT DOCUMENTS

| | | | |
|---|---|---|---|
| 6,097,855 | A | 8/2000 | Levien |
| 6,239,886 | B1 | 5/2001 | Klassen et al. |
| 6,243,059 | B1 | 6/2001 | Greene et al. |
| 6,292,157 | B1 | 9/2001 | Green et al. |
| 6,292,193 | B1 | 9/2001 | Perry et al. |
| 6,377,317 | B1 | 4/2002 | Kiga et al. |
| 6,504,551 | B1 | 1/2003 | Takashima et al. |
| 6,603,452 | B1 | 8/2003 | Serita |
| 6,753,907 | B1 | 6/2004 | Sukthankar et al. |
| 6,774,953 | B2 | 8/2004 | Champion et al. |
| 6,778,184 | B2 | 8/2004 | Arita et al. |
| 6,813,590 | B1 | 11/2004 | Crusius |
| 6,844,881 | B1 | 1/2005 | Chen et al. |
| 6,844,883 | B2 | 1/2005 | Bakhmutsky |
| 7,030,846 | B2 | 4/2006 | Lee et al. |
| 7,034,786 | B2 | 4/2006 | Ham |
| 7,039,231 | B2 | 5/2006 | Brosamle |
| 7,064,770 | B2 | 6/2006 | Lachine et al. |
| 7,084,880 | B2 | 8/2006 | Kimura et al. |
| 7,084,881 | B1 | 8/2006 | Chen et al. |
| 7,088,478 | B2 | 8/2006 | Shirochi et al. |
| 7,126,616 | B2 | 10/2006 | Jasa et al. |
| 2002/0027603 | A1 | 3/2002 | Kuwata et al. |
| 2003/0236675 | A1 | 12/2003 | Duan |
| 2004/0012603 | A1 | 1/2004 | Pfister et al. |
| 2004/0076336 | A1* | 4/2004 | Bassi et al. ............... 382/274 |
| 2004/0113921 | A1 | 6/2004 | Hains et al. |
| 2004/0130669 | A1 | 7/2004 | Shin et al. |
| 2004/0156558 | A1 | 8/2004 | Kim |
| 2004/0218071 | A1 | 11/2004 | Chauville et al. |
| 2005/0024383 | A1 | 2/2005 | D'Souza et al. |
| 2005/0206856 | A1 | 9/2005 | Ishii |
| 2006/0050074 | A1 | 3/2006 | Bassi |
| 2006/0098253 | A1 | 5/2006 | Masuno et al. |
| 2006/0120620 | A1 | 6/2006 | Bassi et al. |
| 2006/0187233 | A1 | 8/2006 | Diefenbaugh et al. |
| 2007/0035706 | A1* | 2/2007 | Margulis ............... 353/122 |
| 2008/0062164 | A1 | 3/2008 | Bassi et al. |
| 2008/0068293 | A1* | 3/2008 | Ishii ............... 345/3.1 |
| 2010/0002026 | A1* | 1/2010 | Seetzen et al. ............... 345/690 |
| 2010/0289835 | A1* | 11/2010 | Holub ............... 345/690 |
| 2012/0274669 | A1* | 11/2012 | Neal ............... 345/690 |

OTHER PUBLICATIONS

Chen, B. et al., "Footprint Area Sampled Texturing", IEEE Transactions on Visualization and Computer Graphics, vol. 10, No. 2, Mar. to Apr. 2004, pp. 230-240.

E. Catmull and A. R. Smith, "3-D Transformations of Images in Scanline Order", Computer Graphics, (SIGGRAPH '80 Proceedings), vol. 14, No. 3, pp. 279-285.

P.S. Heckbert, "Fundamentals of Texture Mapping and Image Warping" (Master's Thesis), Department of Electrical Engineering and Computer Science, University of California, Berkeley, CA, Jun. 17, 1989.

Silicon Video, svW1 Advanced Display Processor, Product Overview, Jul. 17, 2001.

Hoppe, et al., "Piecewise Smooth Surface Reconstruction", University of Washington, Seattle, WA, (SIGGRAPH '94 Proceedings) pp. 295-302.

Mortenson, Michael E., "Geometric Modeling", Wiley 1997.

M.J.D. Powell, "Radial basis function methods for interpolation to functions of many variables" Fifth Hellenic-European Conference on Computer Mathematics and its Applications (Athens, Sep. 2001), Department of Applied Mathematics and Theoretical Physics, Oct. 2001.

Hebson, Robert and Lee, Louie, "Comanche Helmet Integrated Display Sighting System (HIDSS) Optical Distortion Correction Methodology".

International Search Report/Written Opinion for international application PCT/US04/29393, date of mailing Feb. 25, 2005.

Wolf, Stephen, "Color correction matrix for digital still and video imaging system," NTIA TM-4-406, Dec. 2003.

\* cited by examiner

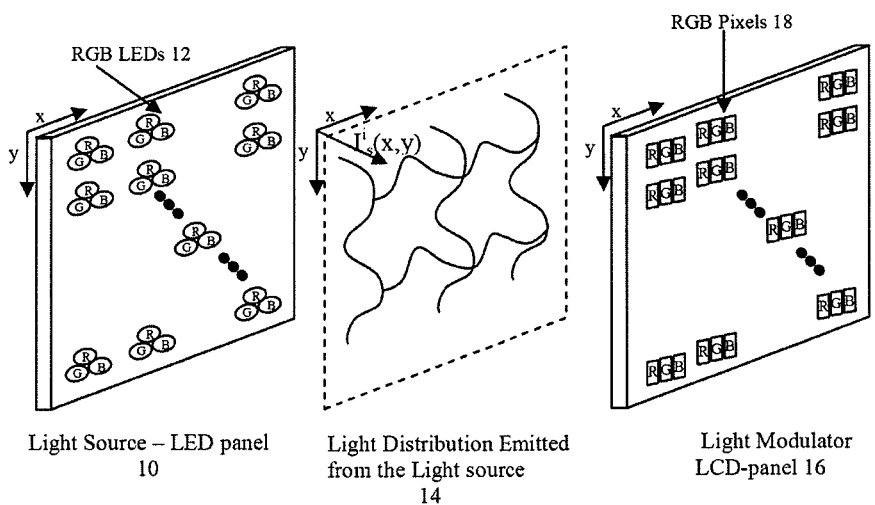
FIG. 1-A
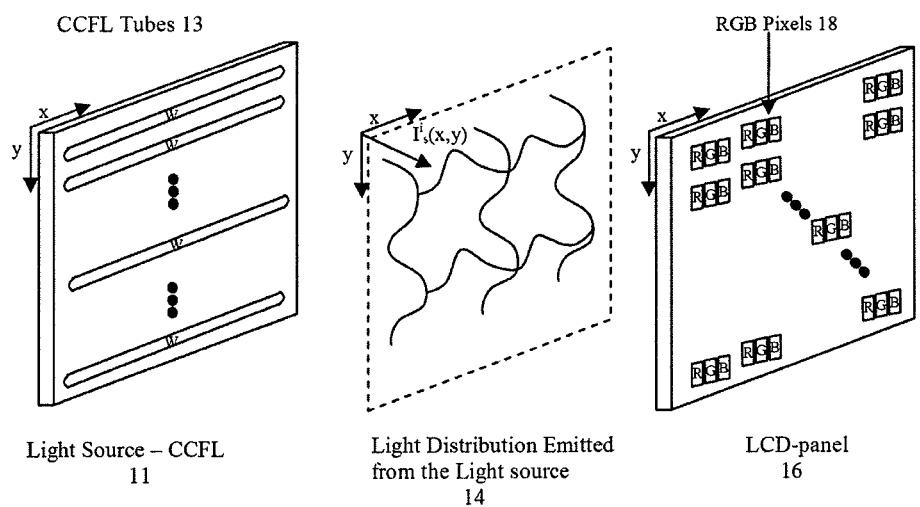
FIG. 1-B

Non-Uniformity Correction Procedure 40

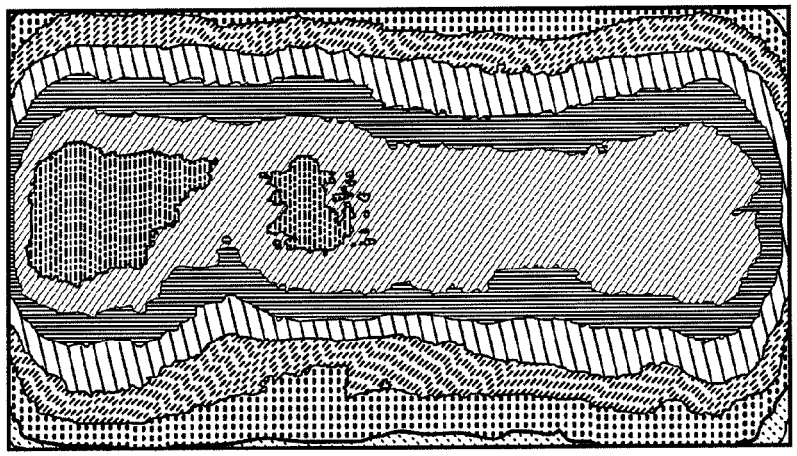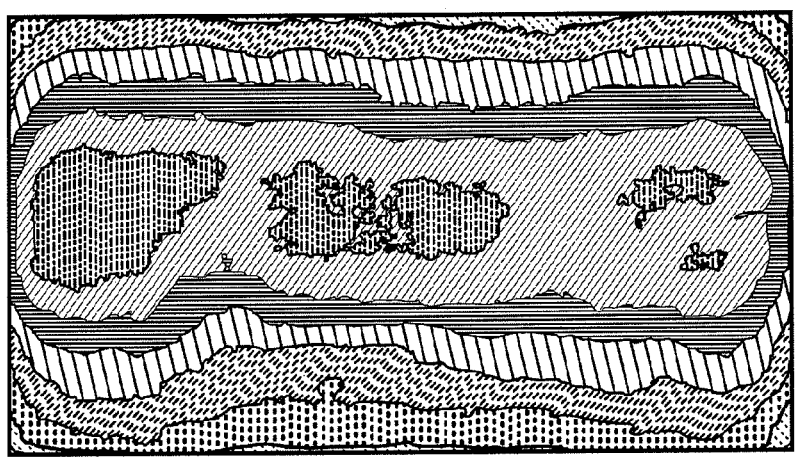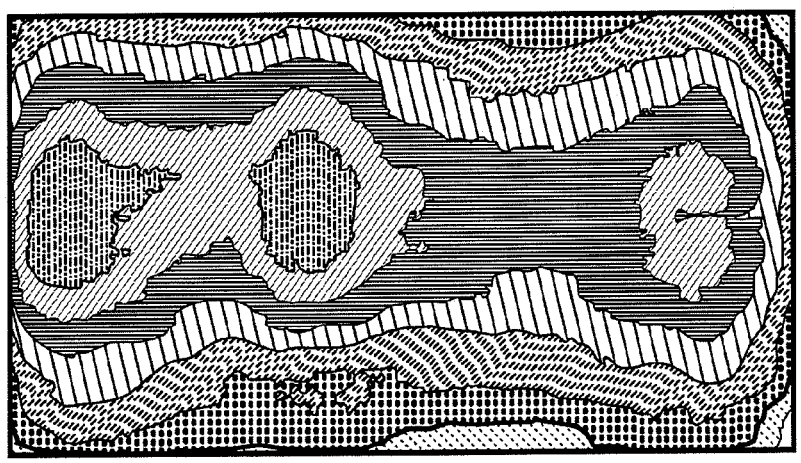
FIG. 6

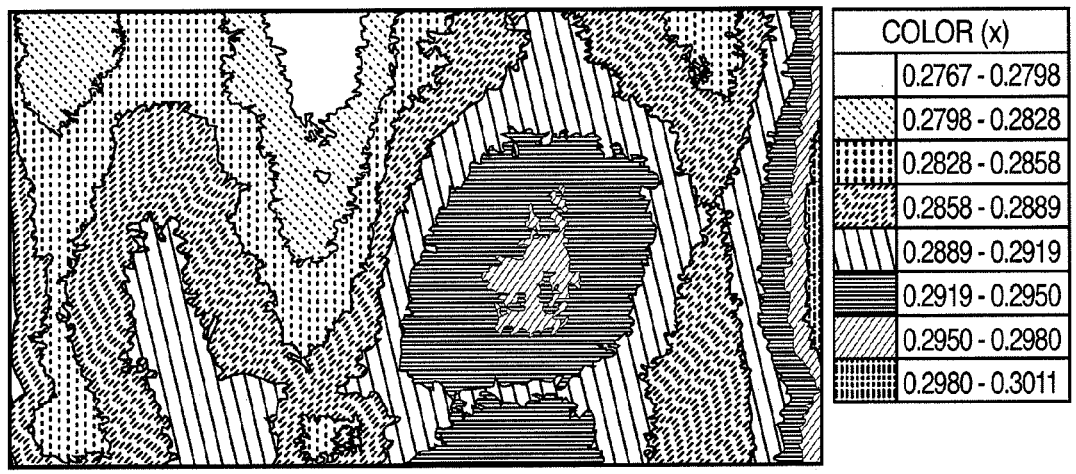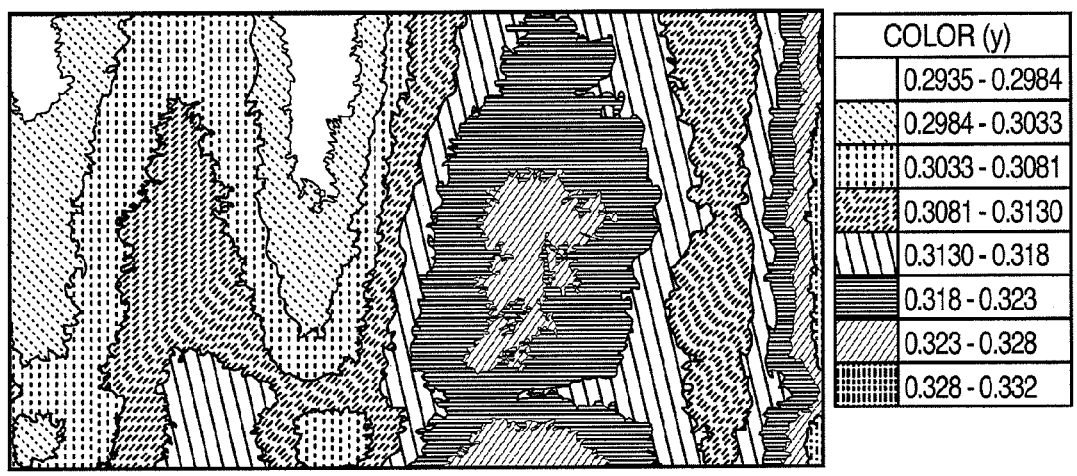
FIG. 8

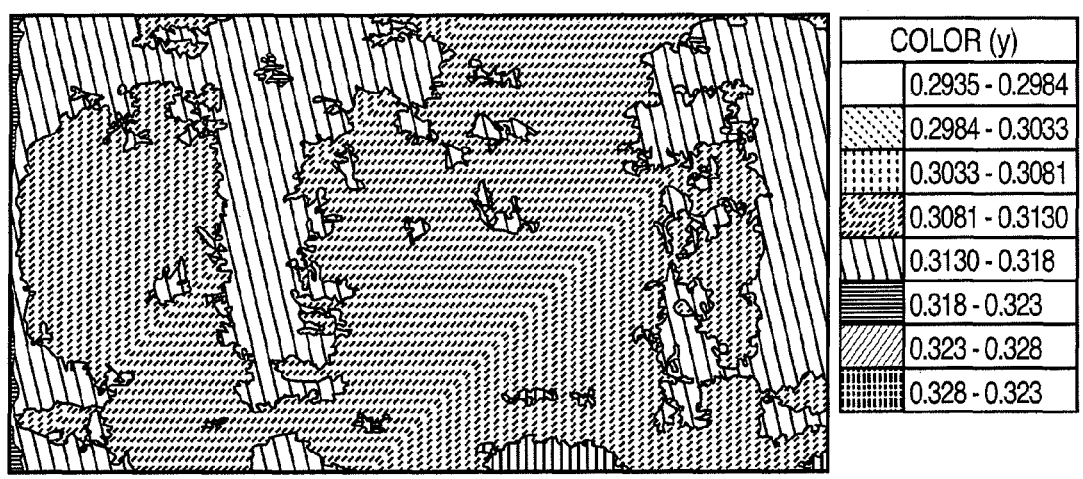
FIG. 23

SYSTEM AND METHOD FOR IMPROVING COLOR AND BRIGHTNESS UNIFORMITY OF BACKLIT LCD DISPLAYS

CROSS-REFERENCE TO RELATED APPLICATIONS

This application is a continuation-in-part of U.S. patent application Ser. No. 11/649,765 filed Jan. 5, 2007. The entirety of U.S. patent application Ser. No. 11/649,765 is hereby incorporated by reference.

FIELD OF INVENTION

The embodiments described herein relate generally to electronic image and video processing, and in a particular relate to color and brightness non-uniformity correction for backlit LCD panels.

BACKGROUND OF THE INVENTION

Light Emitting Diodes (LEDs) are semiconductor diodes made of special material that radiate visible and invisible light (covering infrared to ultraviolet range of electromagnetic spectrum) upon spontaneous recombination of electrons and holes in the p-n junction. A forward biased voltage is normally applied to the p-n junction to accelerate the electron-hole recombination and produce sufficient brightness. The wavelength (and therefore color) of the emitted light depends on the energy of the semiconductor band gap. Early LEDs emitted low intensity red lights. Only recently have new semiconductor materials been available with larger energy gaps allowing LEDs to emit green and later on blue lights. Further, advancements in increasing the brightness and efficiency of LEDs have led to the invention of white LEDs.

A liquid crystal display (LCD), commonly used for TV panels and computer monitors, utilizes the light modulating properties of liquid crystals (LCs). LCs are transmissive elements. They merely guide and do not emit light directly. Therefore, LCD panels produce no light of their own and require an external lighting mechanism to be visible. Conventionally, a Cold Cathode Fluorescent Lamp (CCFL) situated behind the LCD panel, have provided the lighting. More recently, with advancements in HD TV and higher frequency video contents, LED backlit LCD panels have appeared in the television industry as an alternative to CCFL backlit LCDs. There are two kinds of LED backlighting techniques, white LED backlighting and Red/Green/blue (RGB) LED backlighting. A white LED (widely used in notebooks and desktop screens) is actually a blue LED combined with yellow phosphor to give the impression of white light. The spectral curve has big gaps in the green and red parts, in this case. RGB LEDs consist of a red, a green, and a blue LED and can be controlled to produce different temperatures of white. RGB LEDs can deliver an enormous color gamut to screens. The backlight from three separate LEDs can produce a color spectrum that closely matches the color filters in the LCD pixels themselves. This way, the LCD color filter pass-band can be narrowed so that each color component lets only a very narrow band of spectrum through the LCD. That improves the power efficiency of the display since a minimal amount of light is blocked when white is displayed. Also, the actual red, green, and blue points can be moved farther out so that the display is capable of reproducing more vivid colors. Both types of LED backlights can be arranged in arrays to light a screen.

LEDs present many advantages over incandescent light sources including larger color gamut, higher luminous efficiency, deeper black level (higher contrast), lower energy consumption (reduced waste light), longer lifetime, improved robustness, smaller size, faster switching response, and greater durability and reliability. In view of the demands for lower cost and power, lower environmental impact (green) and thinner displays, the industry has undertaken a major effort of improving the backlight technology by a rapid transition from the older CCFL backlighting to the more efficient and flexible LED backlighting. The U.S. Pat. No. 6,888,529 discloses an example of such system wherein an array or banks of RGB LEDs are driven by special circuitries to deliver light to each pixel of the display. The intensity and color content can be adjusted at source by manipulating individual color components directly through the driving circuits.

There exist however several drawbacks of LED sources. The most major drawback is increased color and brightness non-uniformity, due to the fact that LEDs are discrete light sources. Because of the variation in the manufacturing of LEDs and in LED aging, with each LED aging at a different rate, the uniformity is significantly decreased in relation to CCFL backlighting. A wide screen TV has a large number of LEDs (order of 100s) that are needed for a display in comparison with small number of CCFL tubes (order of 10s). Each individual LED has a different level of brightness. Even with sorting and binning, these light sources can have as much as +/−10% variation in brightness, device to device. Further, the use of three separate light sources for red, green, and blue means that the white point of the display can move as the LEDs age at different rates. Aging also occurs with White LEDs, with changes of several 100K of color temperature. White LEDs may suffer from blue shifts at higher temperatures too. As a result, they require more precise current and heat management than traditional light sources, therefore more expensive to build. In fact, if a certain level of uniformity is not achieved, the display will be rejected after production causing loss for the manufacturer.

In recent years, Organic Light Emitting Diodes (OLED) have been used in TV screens and other displays as an alternative to LCDs. Unlike an LC element, an OLED is an active element wherein lies an emissive electroluminescent layer of organic semiconductor compounds which emit light in response to an electric current. This layer is a thin film situated between two electrodes, one of which is normally transparent. The organic compounds are either small molecules or polymers that allow OLEDs to be used directly as display pixels. Thus an OLED display functions without a backlight. In another word, the backlight and the modulator planes are the same.

In general, an image from a display, LCD, OLED or otherwise, is a spatial varying pattern of color and brightness, which aims to match the pattern of an input signal. If the input signal is spatially constant, then its reproduction by a display is expected to be constant in color and brightness. This is referred to as the requirement of color and brightness uniformity, which is a critical requirement for accurate color reproduction by a display. An LCD panel has several other components including light guides and diffusers meant for directing and evenly distributing the light towards the front. Although these elements help improve uniformity, their design becomes complicated with a decreasing panel thickness trend, in turn leading to reduced effectiveness. There is a need for alternative methods of color and brightness adjustments in order to address the abovementioned shortcomings in a more effective and affordable manner.

There exists some prior art solutions on improving the quality of the backlighting mainly by manipulating the source voltage after sensing or visualizing the output signal. These solutions address uniformity in view of primarily the backlight panel, and not the LC panels where the image is actually viewed, therefore have limited effectiveness. For example US 2007/0200513 discloses means for controlling LED drives in response to changes in temperature and voltages. US 2006/0007097 discloses a backlight adjustment method for an LED backlit LCD apparatus. Luminance measurement sensors are integrated with the LCD panel by being disposed on a substrate together with thin file devices as pixels in the panel. None of these addresses the non-uniformities as a viewer would observe. Further, no solution for adjusting the chromaticity of the signal has been provided.

It is an object of one or more aspects of the present invention to provide electronic means for improving color and brightness uniformity of LCD displays addressing simultaneous adjustment of both the backlight source and the LC the light modulators. All aspects of the invention related to the modulator are applicable regardless of the light source.

In one embodiment, LEDs provide the backlight. Not only is the non-uniformity due to aging LEDs addressed, but the present approach can help manufactures in cost savings by having fewer units and tolerating units that would otherwise have failed the thresholds and been discarded. The teachings are also applicable to traditional CCFL backlight sources consisting of a plurality of CCFL tubes.

In another embodiment, Laser Diodes (LDs) are used as the backlighting source. LDs work in a similar fashion as LEDs when used to backlight LCD panels. The principal difference is in light generation where the recombination of electrons and holes occurs as stimulated rather than spontaneous, which is of course a necessary condition for lasing in general. The wavelength spectra of LDs are much narrower than that of the LEDs and result in even more well-defined colors.

The light source components and related figures presented herein primarily illustrate a direct LED backlighting system as an exemplary embodiment. However, as far as the displayed light is concerned, as mentioned, the invention is applicable to edge-lit LEDs, LDs and CCFLs as well as OLEDs (OLEDs being a special case of direct LED).

SUMMARY

The embodiments described herein provide in one aspect, a method for improving color and brightness uniformity of a backlit Liquid Crystal Display (LCD) by studying the measurable physical outputs from the display, and efficiently creating correction maps to modify pixel values of the display. Further, voltage controls for the components of the backlight source can be modified within the same framework.

The embodiments described herein further provide in another aspect a system for improving color and brightness uniformity of a backlit LCD. The system comprises an image generator for displaying a plurality of reference input images on the display; an image capture device to measure the uniformity of the displayed images characterized by physically measurable quantities; a processor to generate a global display response function from the measured data and create a correction grid data map such that the response function becomes a constant value across the display; and a second processor to convert the correction grid data map into a functional form, and apply the correction functions to the input signal. The backlight source can be generated using various technologies, such as a set of LEDs, CCFLs, and Laser Diodes.

The embodiments described herein further provide in another aspect a system and method for improving color and brightness uniformity of an Organic LED (OLED). That is a special LED case wherein the backlight source and the display are essentially one integrated unit, making brightness and color non-uniformity issues even more relevant.

BRIEF DESCRIPTION OF THE DRAWINGS

For a better understanding of the embodiments and/or related implementations described herein and to show more clearly how they may be carried into effect, reference will now be made, by way of example only, to the accompanying drawings which show at least one exemplary embodiment and/or related implementation in which:

FIG. 1 illustrates an LCD panel backlit by direct LED lighting (1-A) and by CCFL lighting (1-B) sources. Although the LEDs are shown as RGB, white LEDs could be used as well. For OLEDs, the backlight and display panels would be the same;

FIG. 6 is a 2D contour plot of the three stimulus values XYZ for the grey level 192, as measured in an exemplary experiment, before correction;

FIG. 8 is a 2D contour plot of the chromaticity values ($x_c$, $y_c$) for the grey level 192, as measured in an exemplary experiment, before correction;

FIG. 23 is a 2D contour plot of the chromaticity values ($x_c$, $y_c$) as measured for the grey level 192, after correction;

Figure 2:
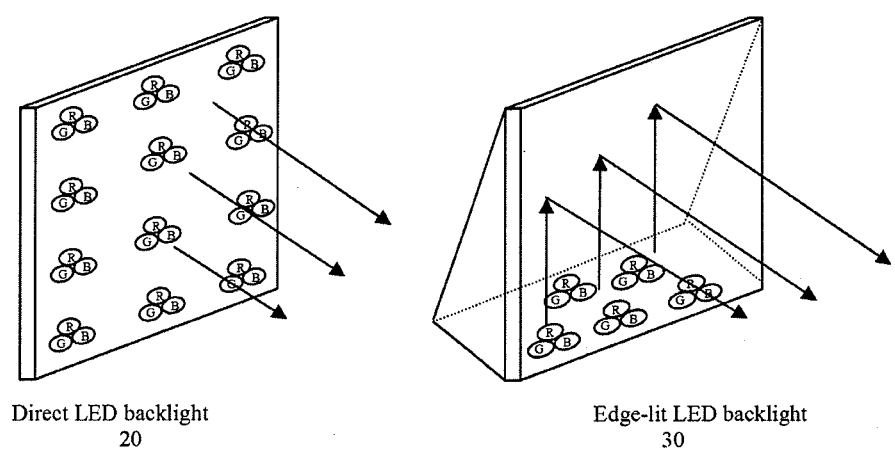
FIG. 2 illustrates two types of LED backlighting, direct and edge-lit.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein.

However, it will be understood by those of ordinary skill in the art that the embodiments and/or implementations described herein may be practiced without these specific details. In other instances, well-known methods, procedures and components have not been described in detail so as not to obscure the embodiments and/or implementations described herein. Furthermore, this description is not to be considered as limiting the scope of the embodiments described herein, but rather to describe the structure and operation of the various embodiments and/or implementations described herein.

FIG. 1 shows an exemplary LCD system that at a high level, from a color and brightness perspective, can be viewed as a light source (also referred to as the backlight panel) 10 or 11 and a light modulator 16 display. The backlight panel, as illustrated in FIG. 1-A, consists of a plurality of Red, Green, and Blue (RGB) LEDs 12, in which case the panel is also referred to as the LED-panel. In lower cost consumer displays the 3 RGB LEDs are often replaced by a single white LED. Alternatively, the light source could consist of a plurality of CCFL tubes 13 as shown in FIG. 1-B or Laser Diodes (not shown). The light emitted by the source has an intensity profile 14 that depends on the type of source, number of elements, etc., and is normally provided by the manufacturer. The light modulator is an LCD panel 16, being a liquid crystal layer consisting of arrays of LCs that form the RGB pixels 18 when a layer of RGB filters is added in front. The light source 10 and the light modulator 16 are variable components; the light source is changed (modulated) by applying different voltages to the LEDs 12 and the light modulator is changed by applying a different input (digital image) signal to the LC pixels 18. There exist additional fixed components in a LCD display system such as light guides and light diffusers that are normally fixed and may be considered as part of the light source. Polarizing shutters, color filters, and even optional sensors are also fixed and may be considered as part of the light modulator.

FIG. 1 is further applicable to flat-panel displays that do not have a backlight panel such as OLEDs, where the organic compounds in the light modulator panel themselves emit different amounts of light in response to an input signal. In the discussion that follows, this exemplary embodiment can be treated by setting the backlight panel to unity.

FIG. 2 illustrates two common types of LED backlighting architectures. One is direct LED backlighting 20, where the LEDs are front-facing and directly illuminate the LCD panel in the viewing direction. The LED panel could also be an edge-lit backlight 30, where the LEDs are perpendicular to the viewing direction. Additional optics, such as a reflective prism is required to redirect the emitted light towards the LCD panel. That makes the edge-lit backlights more conducive to system thickness reduction. In the exemplary illustration of FIG. 2, The LEDs are located at the bottom of the panel facing up. In practice however, the LEDs are located on two edges, both top and bottom, or on either side. LEDs in both exemplary cases are shown as groups of three (R,G,B) to produce white light, although the disclosed methods can be applied to white LEDs as well.

Uniformity is defined as the variation of brightness and color across a display in response to a set of flat input signals. A flat signal or level is one where all pixels (x,y) are assigned a constant digital RGB value:

$$(R(x,y), G(x,y), B(x,y)) = (R_0, G_0, B_0), \text{ For all } (x,y) \quad (1)$$

Where R(x,y) refers to the value of the R (red) component at the pixel position (x,y) and similarly for G (green) and B (blue). The pixel positions (x,y) are integer values, meaning column x and row y, and range over the resolution W×H of the display, where W is the horizontal resolution and H is the vertical resolution:

$$0 <= x <= (W-1) \text{ and } 0 <= y <= (H-1) \quad (2)$$

However in the mathematical formulation disclosed herein, (x,y) are allowed to range over any real numbers. The pixel color values ($R_0$, $G_0$, $B_0$) are integers taking values in [0, $2^{b_n}-1$], where $b_n$ is the bit depth of the display, e.g. 8, 10, etc. In the internal computations, the color values are allowed to be any real values, and are adjusted to the permitted integer range when being input as a signal to the display.

The uniformity of brightness and color is defined in terms of measurable physical quantities. Various different measurable quantities have been defined to describe brightness and color. The most widely used are the Commission Internationale de L'Eclairage (CIE) XYZ tristimulus values, from which all other relevant quantities can be computed. The Y components is the luminance value, also denoted L in the art, that represents what is commonly referred to as brightness or intensity, and has units of candela/$m^2$ (cd/$m^2$).

Minimizing variations in the luminance are most critical to obtaining a uniform display. The X and Z components are additional color quantities required to correctly define the color, their measured units are also cd/$m^2$. Color for displays, with luminance factored out, is more easily understood in terms of the chromaticity values, rather than XYZ. The chromaticity components ($x_c$, $y_c$) are derived quantities given by:

$$x_c = \frac{X}{X+Y+Z}$$
$$y_c = \frac{Y}{X+Y+Z}$$
$$z_c = 1 - x_c - y_c \quad (3)$$

Since in color science (x,y) is normally used for the chromaticity values, the c subscript is included in the notation to distinguish the chromaticity values form the spatial pixel coordinates (x,y). The z-chromaticity $z_c$ is not an independent variable and hence not used. A color's chromaticity values are plotted as coordinates on the CIE chromaticity diagram, and define the pure aspect of color, with component of brightness or luminance is decoupled. Thus XYZ and $x_c y_c Y$ can be viewed as two orthogonal coordinate systems that fully define the brightness and the pure color aspect of any displayed color. Whereas XYZ is often the measured quantity, $x_c y_c Y$ is a quantity that is normally used to describe a color. Typical chromaticity values ($x_c,y_c$) for the RGB primaries in a display are in the vicinity of (0.640,0.330) for R, (0.300,0.600) for G and (0.150.0.060) for B. The white D65 reference has a chromaticity of (0.3127, 0.3290). Chromaticity of pure white (or the grey levels) is also referred to as color temperature or the white point. Most color measurement instruments report XYZ values as well as the chromaticity values.

Therefore, in this space uniformity, or alternatively non-uniformity, for a measured component M={X,Y,Z,$x_c,y_c$} at a specific level (flat signal) can be defined as:

% Uniformity=100*(1−($M_{max}$−$M_{min}$)/$M_{max}$)

% Non-uniformity=100−% Uniformity (4)

where $M_{max}$ and $M_{min}$ are the maximum and minimum values of the measured component across all pixels (i.e. all (x,y)) in the display, at a specific level. In particular, luminance (brightness) uniformity is given by:

% Luminance Uniformity=100*(1−($Y_{max}$−$Y_{min}$)/$Y_{max}$)

% Luminance Non-uniformity=100*($Y_{max}$−$Y_{min}$)/$Y_{max}$ (5)

In practice, uniformity is computed by measuring M at a subset of pixels as opposed to every pixel. Both terms uniformity and non-uniformity are used herein with understating that they are merely two different views.

An ideal uniform display will have the same measured XYZ values across all pixels, for any flat signal. This would be 100% uniformity across all levels, which is not achievable in practice. The goal of a correction technique is to improve uniformity to within acceptable limits. For example, in consumer displays, having luminance uniformity levels of >=70% for pure white (level $R_0$=$G_0$=$B_0$=255 for 8 bits) is often viewed as sufficient. Uniformity in other components is not considered. The present approach provides with means for obtaining a much higher uniformity across multiple levels in an efficient manner, which is often necessary for professional displays and can also serve to raise the standard for consumer displays. Furthermore uniformity in both luminance and chromaticity is addressed. Since color temperature or white point is a subset of the chromaticity values, color temperature and white point correction are automatically corrected once chromaticity has been addressed.

Figure 3:
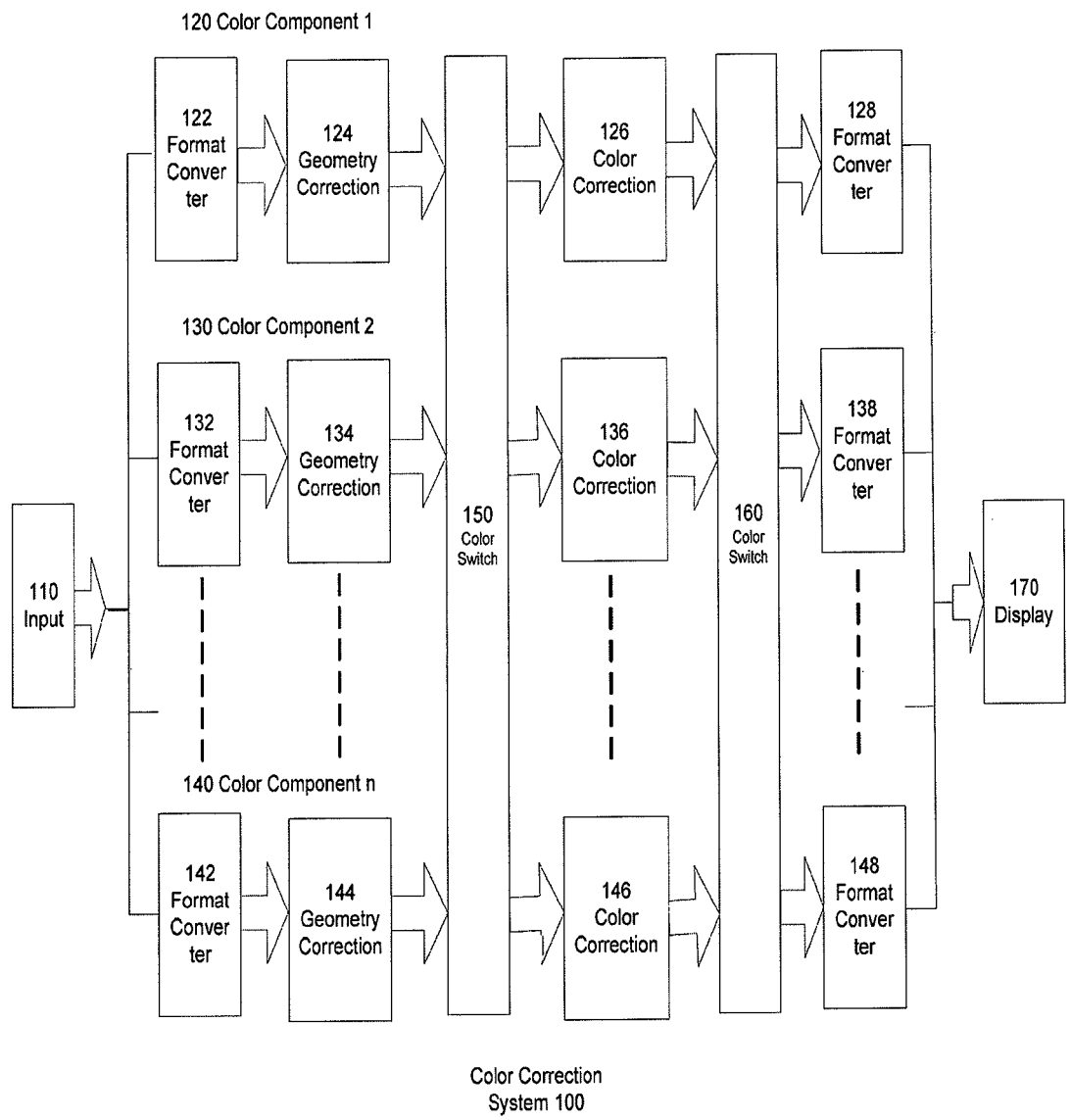
FIG. 3 illustrates an exemplary prior art color and brightness correction system.

Once the non-uniformities are quantified and so obtained, they can be electronically corrected. The co-pending patent application Ser. No. 11/649,765 describes a hardware system for applying both color and geometry corrections. FIG. 3 illustrates the color correction system 100 and its components which are herein incorporated by reference.

The sources of non-uniformity in an LCD display can be classified as two groups: a) those due to non-uniformities in the backlight panel (light source) and b) those due to non-uniformities in the LC panel (light modulator). This implies that uniformity correction may proceed by adjusting the variable controls of either the backlight panel or the LC panel, or in the most general case, adjusting the controls of both the backlight and LC panels.

In the exemplary case of LED backlighting, the variable controls for the backlight panel are the voltages applied to the LEDs. Other components, such as diffusers are fixed and not variable. We will denote these voltages as a vector:

$$\vec{V} = \begin{bmatrix} V_1 \\ V_2 \\ \vdots \\ V_L \end{bmatrix} \quad (6)$$

Where $V_i$ is the voltage at the i-th LED, and L is the total number of LEDs. If a common voltage is applied to all LEDs, then all components would have the same value. The notion and mathematics is also applicable to CCFL and LD backlit panels with i referencing the tubes.

The variable controls for the LC panel are the individual pixel digital RGB values, which is the input digital signal itself. The following notations are used interchangeably to indicate the pixel values:

(R(x,y),G(x,y),B(x,y)), or $\vec{C}(x,y)=(C_1(x,y),C_2(x,y),C_3(x,y)),\{1,2,3\}=\{R,G,B\}$ (7)

If a flat level is used then the pixel position (x,y) dependency is dropped:

(R,G,B), or $\vec{C}=(C_1,C_2,C_3)$ (8)

Figure 4:
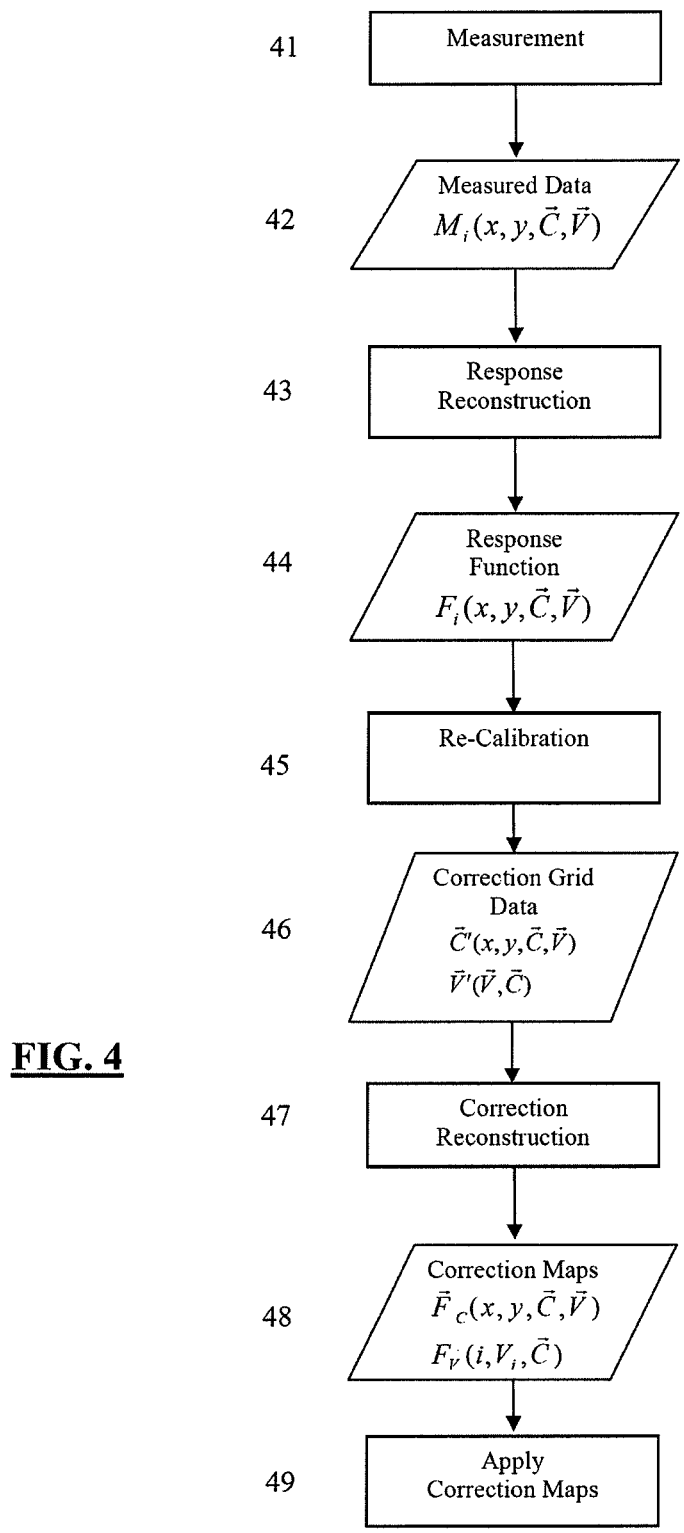
FIG. 4 illustrates steps for color and brightness non-uniformity correction, as embodied in the invention.

FIG. 4 illustrates one embodiment of this invention, wherein steps for non-uniformity correction procedure 40 is formulated and herein explained. At the first step 41, the uniformity of the display, characterized by any one or more measurable physical quantities $M_i\in\{X,Y,Z,x_c,y_c\}$, is measured in response to a set of one or more flat signals $\{\vec{C}\}$, at one or more backlight (voltage) settings $\{\vec{V}\}$. This measured data 42 is represented as:

$M_i(x,y,\vec{C},\vec{V})$ (9)

As indicated, the measured value depends on the pixels position (x,y) due to the non-uniformity, the flat signal $\vec{C}$ and the voltage values $\vec{V}$ of the backlight sources. For each backlight setting, all light source components are usually set to a common value during the measurement step. If only brightness is being corrected, then only the luminance value $M_i$=Y will be measured. For a uniform display, $M_i$ would be constant across pixels and independent of (x,y). The objective of the non-uniformity correction is to bring this generally variable quantity to a spatially constant value $\overline{M}_i$ depending only on the input signal and backlight voltage:

$$M_i(x, y, \vec{C}, \vec{V}) \xrightarrow{\text{after correction}} \overline{M}_i(\vec{C}, \vec{V}) \quad (10)$$

From the measured data 42, the response of the display to an arbitrary RGB signal is reconstructed 43. This response is denoted as a Function 44 to be used in computing the correction. Each physical quantity has its own response, allowing the measured data to be written as a function:

$$M_i = F_i(x, y, \vec{C}, \vec{V}) \quad (11)$$

The re-calibration stage 45, determines the correction in the signal $\vec{C}$ and voltage $\vec{V}$ required to have a uniform measurement. It seeks a solution to a constant:

$$\overline{M}_i = F_i(x, y, \vec{C}', \vec{V}') \quad (12)$$

Where $\vec{C}'$ is the new signal, or new pixel values, which due to the non-uniformity vary in (x,y) and depends also on the input pixel value. $\vec{V}'$ is the new voltage setting for the LEDs, which may also depend on the pixel value. As will be shown however, it is possible to make $\vec{V}'$ pixel value independent. The solution is essentially computing an inverse in multiple-variables:

$$\{\vec{C}', \vec{V}'\} = F_i^{-1}(\overline{M}_i) \quad (13)$$

The non-uniformity correction can therefore be written as:

$$\vec{C} \rightarrow \vec{C}'(x, y, \vec{C}, \vec{V})$$

$$\vec{V} \rightarrow \vec{V}'(\vec{V}, \vec{C}) \quad (14)$$

The computation of $\{\vec{C}', \vec{V}'\}$ is done at a subset of coordinates in the $(x, y, \vec{C}, \vec{V})$ parameter space known as grid points. For example (x,y) may be a subset of 17×17 pixel positions in a 1920×1080 resolution display. There are various reasons for that, among them:

1) Measurement data may only be available at discrete points.
2) To speed up the process only a subset of points are measured.
3) The non-uniformity variation is smooth and can be accurately computed from a subset of points.
4) The measurements points are often taken to geometrically correspond with the LEDs; hence a smaller subset is used since the number of LEDs is much smaller than the pixel resolution.
5) Computing the inverse solution exactly (in variable form) is not possible and must be done numerically. Therefore computation time is significantly reduced by using a subset of points.

As such, the computation provides a correction grid data 46. Correction reconstruction stage 47 converts the correction grid data 46 into functional form so that it can be applied to all pixel positions and color values. Analogous to equation (11) one obtains the correction functions 48:

$$\vec{C}' = \vec{F}_C(x, y, \vec{C}, \vec{V})$$

$$V_i' = F_V(i, V_i, \vec{C}) \quad (15)$$

The function $F_V$ provides the new voltage levels at the i-th LED given its initial voltage and the input pixel value. The correction function $F_C$ is referred to as the pixel correction map or pixel map for short, and the correction function $F_V$ is referred to as the backlight correction map or backlight map for short. The form of the correction functions may be determined by the hardware that will apply the correction to the display. A general hardware efficient form is described in the U.S. Pat. No. 7,324,706 where a set of data points is represented using a polynomial surface functional form.

At the final step 49 the correction maps are applied to the input signal and backlight controls using a hardware circuit. The hardware evaluates the maps and sends the new pixel values to the display controller and the new voltage values to the backlight controller. The co-pending patent application Ser. No. 11/649,765 describes a hardware system 100 (FIG. 3) for applying the color correction at the pixel map level. Due to the highly efficient functional form, a similar system can also be implemented in a low-cost FPGA. For the backlight adjustment, the same hardware can be used to evaluate the backlight map and provide the new voltage values for the LEDs.

Figure 5:
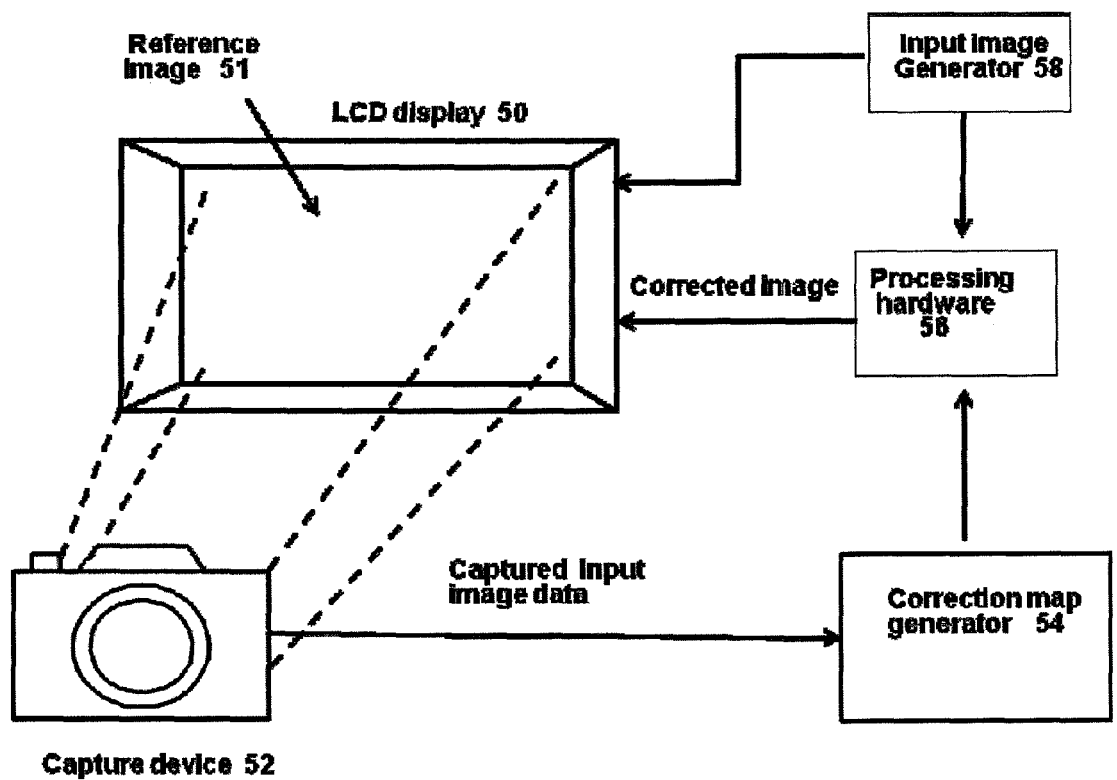
FIG. 5 illustrates an overview of a color and brightness non-uniformity correction system, as embodied in the invention.

The non-uniformity correction procedure 40 steps provide a highly efficient and accurate method for correcting brightness and color non-uniformity in LCD displays. FIG. 5 illustrates an overview of an embodiment of the invention, as an exemplary system employing this approach. The system consists of a capture device 52 such as a colorimeter that captures and provides measureable characteristics of a reference image 51, which are normally flat levels, created by an input image generator 58 and displayed on an LCD panel 50. A processing unit (could be an embedded processor or a software running independently on a computer) 54 analyzes the measured values against the required values and generates a correction grid data containing a map of new pixel values and LED voltage settings that would correct for non-uniformities. A hardware processor 56, such as the one described in patent application Ser. No. 11/649,765, implements and applies the correction to the input image, and submits to the display 50. The function of each component of this system is herein discussed in a greater detail.

The measurement of physical quantities 41 is normally performed using a colorimeter or a spectroradiometer. These devices 52 come in two forms: spot meter types, and 2D imaging camera types. A spectroradiometer is usually a spot meter that measures physical quantities at a given point or pixel. A specific pixel can be measured or an average value in a defined neighborhood of a specific pixel can be measured. Spectroradiometers are very accurate devices and are often used in calibrating colorimeters. Colorimeters are available either as spot meters, in which measurements are performed at or about a single point, or as a 2D imaging camera. In the latter form, the colorimeter can take a picture of the display and simultaneously measure a very large number of pixels in the 2D (x,y) position space. The user may specify the pixel positions to measure. Normally a regular grid of points, denoted as $N_y$ rows by $N_x$ columns, are extracted from the 2D camera image for computation. Similar to the spot meter, the camera performs an averaging over a small defined neighborhood of the measured pixels. In a preferred embodiment, a 2D camera type of colorimeter is used for the measurement, because non-uniformity, by definition, is a measurement over the 2D (x, y) positions. In addition, the pixel neighborhood averaging process of the colorimeter lends itself well to characterizing non-uniformity, since visual perception does not detect individual pixels (with the exception of "broken" pixels); rather it averages over neighboring pixels. A spot colorimeter could be used for precision measurement of a 2D grid of points. This however would require physically moving the spot meter across the display, and is time consuming unless a small number of points are measured. Use of multiple spot meters is possible but costly. Regardless, the method is independent of any specific measuring instruments, only requiring that a grid of data points, sampled in both the x and y direction, be measured. Both the 2D and spot colorimeters are able to measure all relevant physical quantities, such as XYZ tristimulus values. In an exemplary discussion that follows, the term camera refers to a 2D colorimeter.

The measurement process further requires selecting a set of flat reference signals 51 (also referred to as signal levels or levels) to be input to the display. A set of required levels can be manufactured or provided using commercially available tools, such as a test pattern generator. The number of levels to measure, and their corresponding pixel values, depends on several factors including:
1) The levels at which non-uniformity is to be characterized. In the most common case, non-uniformity is computed and corrected at pure white RGB=(255,255,255) wherein a smaller number of levels need to be measured.
2) The type of correction. That is whether brightness correction alone, color correction alone, or both corrections simultaneously are required.
3) Accuracy of the correction. If uniformity is required to be very high, more levels may need to be captured.
4) Display non-uniformity behavior. Depending on how poor a display's uniformity is, it may be necessary to capture many levels, even if correcting only brightness at pure white.
5) The speed of the entire correction process. In a manufacturing environment, depending on the rate of production, speed can be the most critical factor. Measurement of many levels may not be feasible.

These factors not only determine the reference levels, but also impact the approaches and optimizations used in the steps that follow the measurement stage.

The reference levels are considerably reduced in number by utilizing the color superposition principle. In terms of the XYZ values, this principle states that the color produced from the combination of two independent color sources in an additive color system (such as an LCD), has its tristimulus values given by the sum of the tristimulus values of the two sources. In equations:

Color New=Color1+Color2

Color1: $(X_1, Y_1, Z_1)$, Color2: $(X_2, Y_2, Z_2)$

Color New: $(X, Y, Z) = (X_1+X_2, Y_1+Y_2, Z_1+Z_2)$ (16)

A displayed image on an LCD consists of 3 independent color components, R, G and B. The superposition principle implies that the tristimulus values of any color (R, G, B) can be computed by adding the tristimulus values of the R, G and B components:

$$X_{(R,G,B)} = X_R + X_G + X_B$$

$$Y_{(R,G,B)} = Y_R + Y_G + Y_B$$

$$Z_{(R,G,B)} = Z_R + Z_G + Z_B \quad (17)$$

Therefore a display's uniformity can be fully characterized by measuring levels of pure red, pure green and pure blue, pure meaning other components are turned off (pixel value of 0). Any combination color, including grey levels, can be achieved by the appropriate sum of the individual components (R, G, B). Let $N_C$, C={R,G,B}, denote the number of pure levels of component C. The levels to measure, in the most general case of correcting brightness and color across all pixel color values, are then:

Pure Red Levels: $(R,G,B)=(R_i,0,0), i=1\ldots N_R$

Pure Green Levels: $(R,G,B)=(0,G_j,0), j=1\ldots N_G$

Pure Blue Levels: $(R,G,B)=(0,0,B_k), k=1\ldots N_B$ $$0 \leq R_i, G_j, B_k \leq 2^{b_n}-1 \quad (18)$$

$b_n$ indicating the number of bits (e.g. 8). In practice, when turning the two components off for a pure color (by setting pixel value 0), there continues to be leakage of light from the backlight through the turned off liquid crystals and their filters. This breaks equation (18) by a small, yet not negligible amount. This leakage is referred to as the black level offset. It is a measure of the amount of light that leaks through when all pixels are set to 0 (R=G=B=0). To correct for the black level offset, and as a test of the superposition principle, the pure grey levels where (R=G=B), are also measured. In fact, if only luminance correction is being done, it is often sufficient to measure the pure grey levels only. Therefore a $N^w$ number of pure greys are also added to the reference levels for measurement:

Pure Grey Levels: $(R,G,B)=(W_l,W_l,W_l), l=1\ldots N_W$ $$0 \leq W_l \leq 2^{b_n}-1 \quad (19)$$

$W_l$ indicates the common pixel value assigned to each color components for a pure grey level. The set of levels to measure, in the most general scenario, are summarized as:

Measurement Signal Levels $$\{\vec{C}\} = \{\{(R_i,0,0)\}, \{(0,G_j,0)\}, \{(0,0,B_k)\}, \{(W_l,W_l,W_l)\}\}$$

$$i=1\ldots N_R; j=1\ldots N_G; k=1\ldots N_B; l=1\ldots N_W \quad (20)$$

In practice, a much smaller subset may be measured depending on the factors discussed above.

In addition to data at different levels, measured data at different backlight voltage settings is also needed. In principle, for each level, the voltage for each LED should be independently varied and the tristimulus Point Spread Functions (PSF) measured. Thus, PSF refers to the spread of the light in (x, y) space for a single LED. In practice, it is difficult and time consuming to vary individual LED and determine how the tristimulus values change in voltage and (x, y) space. Instead the voltage settings are changed to common values for all LEDs, and the tristimulus quantities are measured to determine the voltage dependence. This essentially neglects the (x, y) dependence contained in the PSF. The different voltage settings are indicated by:

Measurement Voltage Settings $$V_{si}, i=1\ldots N_V$$

At $i$-th setting: $V_1 = V_2 = \ldots = V_L V_{si}$ (21)

The same setting is applied to all LEDs for a given voltage. The common voltage $V_{si}$ is also referred to as the common or initial backlight setting. It should be viewed as a backlight control, which determines a common state for all the voltages. Such a control is often provided in a display OSD. In (21) the voltages are set equal to this control but the control may be a normalized quantity, directly proportional to the LED voltages. The LED voltages are varied to provide higher or lower light intensity (luminance) in areas of non-uniformity, as will be described below. They may also be varied for adjusting color uniformity in the case of RGB LEDs. In practice however, this is not reliable since chromaticity correction is more subtle and requires finer control. Therefore chromaticity correction is better handled by the pixel map. In particular RGB LEDs may be viewed as a unit on the same footing as white LEDs, in terms of voltage variation. We use this to simplify the equations below, though the approach may easily be extended to have independent RGB voltage control.

To generate the backlight correction map, it is also necessary to know the PSF function, which specifies how the light from a single LED spreads out in (x, y) space. A single LED will illuminate many pixels, and changing its voltage, via the backlight correction map, will affect many pixels. The PSF function can be measured at the backlight plane by turning on a single LED to its maximum value and capturing the intensity variation in (x, y). The PSF can also be approximated by appropriate mathematical models (such as Gaussian). Alternatively in the absence of a PSF function, an iterative approach can be used to compute the backlight correction map. Both scenarios will be discussed. In one embodiment the PSF is given (provided, estimated or directly measured). In another embodiment the PSF is not know. In the exemplary case of RGB LED backlighting, the light from the three LEDs combine to form a white light with a broad spectral distribution, incident on the LC panel. A single PSF, analogous to a white LED PSF, may be used to describe the joint effect of the 3 LEDs, if the individual LEDs are not independently adjusted to vary the chromaticity of the white light. This is similar to viewing them as a unit from the voltage adjustment standpoint.

For the embodied system depicted in FIG. 5, the measurement proceeds by the input image generator 58 inputting each level in (20) to the display 50, at a given backlight (voltage) setting, and having the camera 52 capture the display output. The camera 52 is placed in front of the display 50 as in FIG. 5, positioned to capture the entire display as large as possible onto its sensor. The camera views the display exactly as a user would and hence the non-uniformity measure by the camera matches that perceived by a viewer. This implies that the present approach corrects for non-uniformity of the full display system, regardless of the source of non-uniformity (LEDs, diffusers, LC panel, etc.), at the final point when the image is being perceived by the viewer's visual system. Correcting the final image at the output of the display is most critical in achieving high quality displays. The process is repeated for the all backlight settings of (21).

From the camera captured images, the physical quantities can be extracted for essentially all pixels. Although the resolution of the camera restricts the number of pixels that can be accurately measured, this number is much greater than the number of data points usually required. All colorimeters are equipped with software for extracting data for any set of user specified grid points. Data is available for all pixels, but a much smaller subset is normally used for computation since uniformity is a smoothly varying function that gradually changes over a large number of pixels and not on a per pixel basis. The pixel positions at which the measured data is obtained, taking a regular grid of $N_y$ rows by $N_x$ columns, are denoted:

$$\text{Pixel at measured column } a, \text{ row } b: (x_a, y_b), a=1 \ldots N_x, b=1 \ldots N_y \qquad (22)$$

Figure 7:
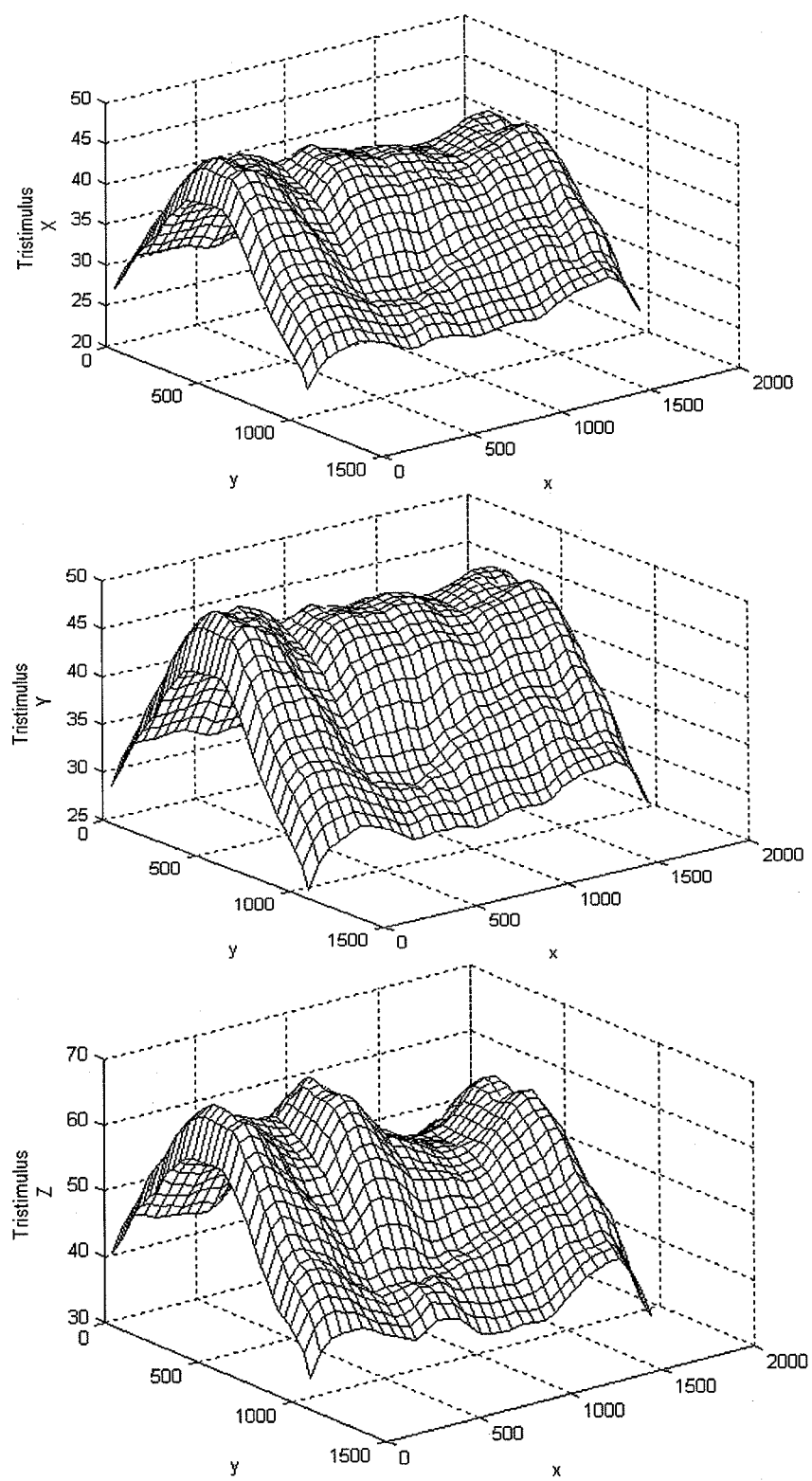
FIG. 7 is a 3D plot of the three stimulus values XYZ as a function of the pixel positions for the grey level 192, as measured in an exemplary experiment, before correction.
Figure 9:
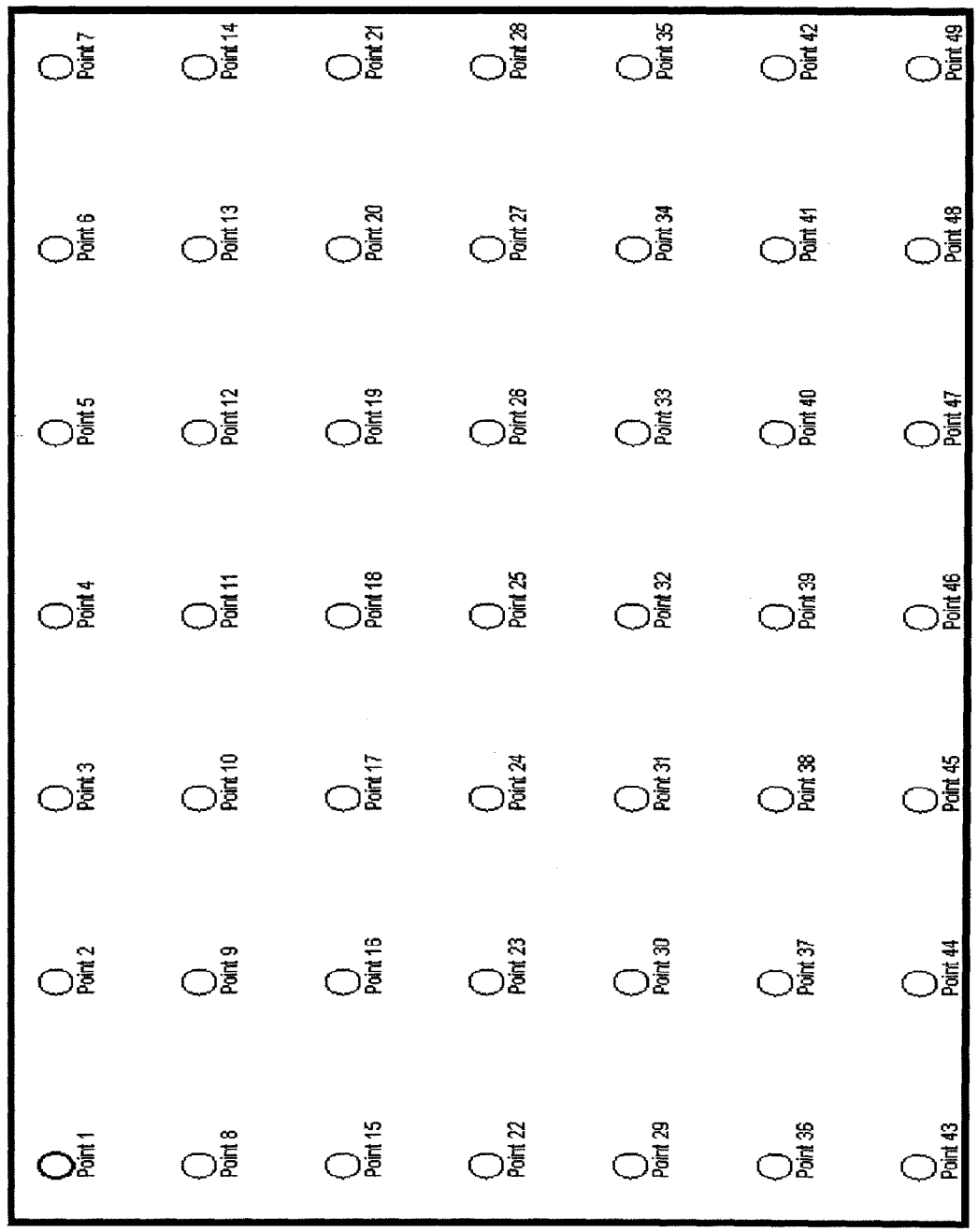
FIG. 9 illustrates a 7×7 grid point map over the display, as selected for the exemplary experiment.
Figure 10:
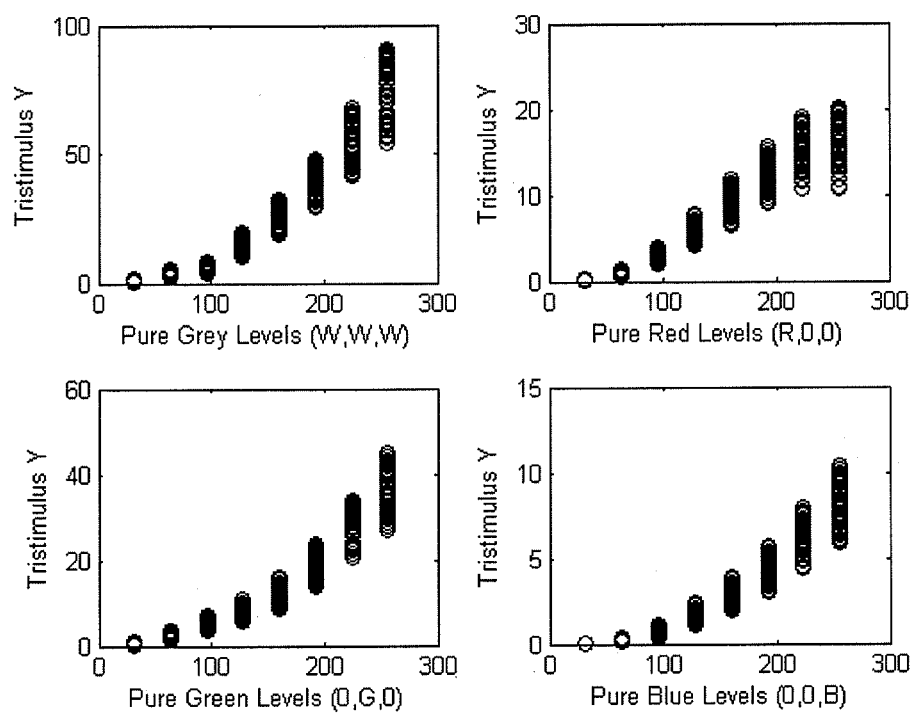
FIG. 10 is a plot of the measured tristimulus value Y (luminance) for the grid points of FIG. 9 for pure Grey, Red, Green, and Blue levels.

In one exemplary setting, for the purpose of illustration, a 2D colorimeter PM-1423F by Radiant Imaging Inc was used. The measured data 42, in part, is displayed in various plots. All tristimulus quantities are in units of $cd/m^2$. FIG. 6 shows 2D contour plots of the measured XYZ tristimulus values (Y also referred to as luminance L) across the display for level (192,192,192) (i.e. mid to high grey level) at the default backlight setting of 0. The display is 1920×1080 resolution with the x coordinate range is [0,1920] and the y coordinate range [0,1080]. The origin of the display is top left, with the x coordinate horizontal, increasing to the right, and the y coordinate vertical, increasing to the bottom. The voltage settings are "normalized" (i.e. linearly scaled and shifted) to a unit-less range of −16 to +16, with −16 corresponding to near 0 volts. FIG. 7 shows the 3D plot of the same data. FIG. 8 illustrates 2D contour plots for the chromaticity values ($x_c$, $y_c$) across the screen at the same level. The contours have been turned off for clarity of the plots. Similar 2D/3D plots can be obtained for all levels. FIG. 10 shows the plots of the luminance (Y) values for 8 W (grey), R, G and B levels at a subset of 7×7 pixel positions (grid points) across the screen, with backlight setting 0. (A larger number of grid points are actually used in the computation however a small set is shown for purposes of clarity in the plots). The grid point positions, equally spaced in x and y starting from the center, are shown in FIG. 9 superimposed on an image of the display. In this exemplary data, the levels are taken to be (for an 8 bit display):

$$\text{Measured Levels: } \{32,64,96,128,160,192,224,255\} \qquad (23)$$

Figure 11:
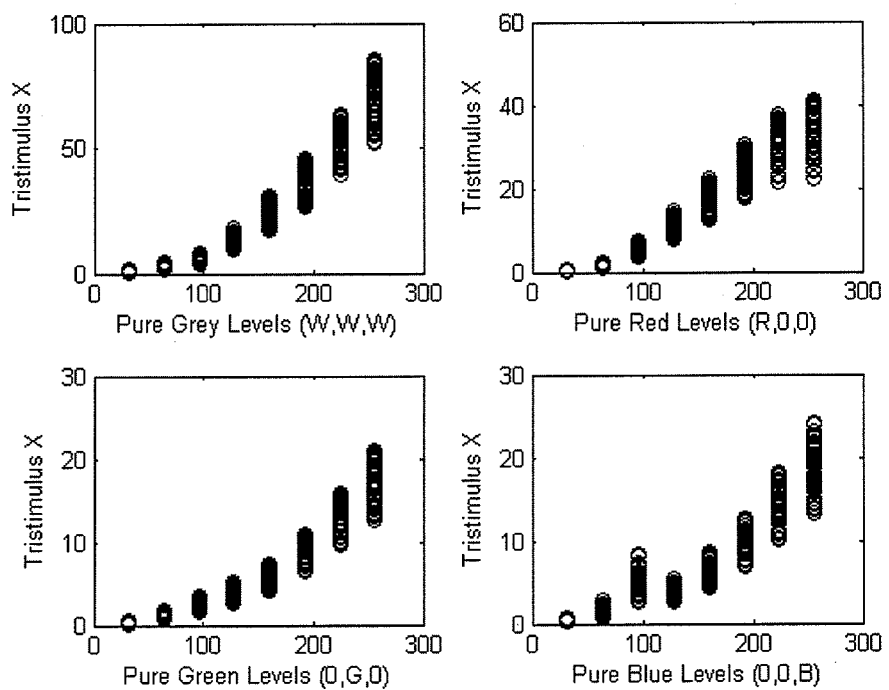
FIG. 11 is a plot of the measured tristimulus value X for the grid points of FIG. 9 for pure Grey, Red, Green, and Blue levels.
Figure 12:
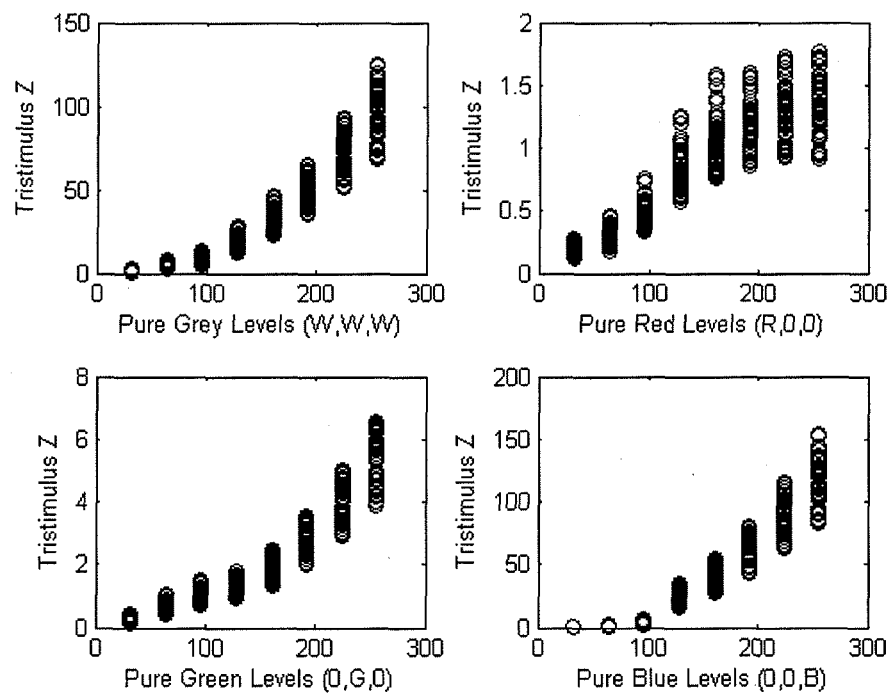
FIG. 12 is a plot of the measured tristimulus value Z for the grid points of FIG. 9 for pure Grey, Red, Green, and Blue levels.

For a given level, the values measured at the different pixels are seen as being displaced vertically from one another (i.e. Y varies from pixel to pixel). If there was no non-uniformity, all grid points for a given level would be coincident. FIGS. 11 and 12 show similar data for tristimulus values X and Z. Note that the highest contribution to X, Y and Z are respectively from the R, G and B components, as expected from the tristimulus response profiles. In addition, the data on average, follows a power law functional form. As can be seen from the various plots, this display has non-uniformity across all levels, in both brightness and color, characterized by variation in XYZ or $x_c y_c Y$. At mid-grey level (192,192,192), the uniformity in luminance and color, and corresponding non-uniformities, are shown in table 1.

TABLE 1

Uniformity Statistics Before Correction

| Physical Quantity | % Uniformity | % Non-Uniformity | Average |
|---|---|---|---|
| Tristimulus X | 57.56 | 42.44 | 37.53 cd/m² |
| Tristimulus Y (Luminance) | 58.73 | 41.27 | 40.58 cd/m² |
| Tristimulus Z | 52.07 | 47.93 | 52.12 cd/m² |
| **Chromaticity $x_c$ | 93.85 | 6.15 | 0.2882 |
| **Chromaticity $y_c$ | 91.03 | 8.97 | 0.3119 |

The non-uniformities in the tristimulus values are quite large, with luminance being only 58.73% uniform across the display. The uniformity numbers for the chromaticity coordinates are misleading (hence the **) and seem to suggest that the color is uniform. Since the chromaticity values are of the order ~0.3, the % uniformity values computed from eq. (4) tend to be large, even if there is significant non-uniformity. For chromaticity, variations of the order 0.02 can be visible. Therefore it is much more accurate to look at the tristimulus values, where non-uniformity in X and Z will lead to perceptually significant non-uniformities in the color. In a similar manner, non-uniformities can be computed at all measured levels. This particular measured display has a significant amount of non-uniformity in both luminance and color, which is typical of LCD displays. The data from this exemplary experiment is herein used to describe in detail the various embodiments of the invention with reference to FIG. 5.

Figure 13:
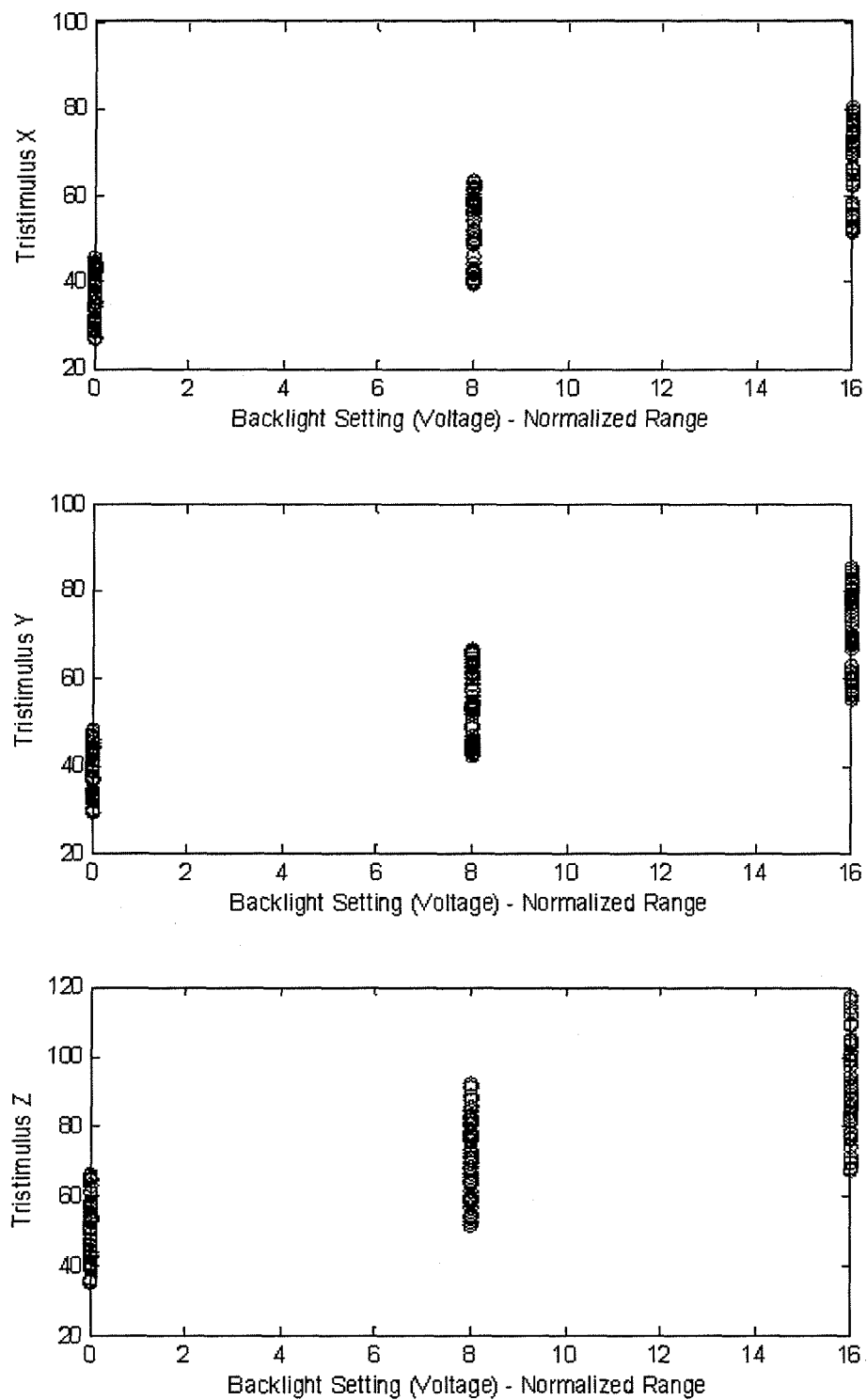
FIG. 13 is a plot of the measured tristimulus values XYZ for the grid points of FIG. 9 as a function of the backlight voltage setting for the grey level 192. The voltage values are in a normalized range.
Figure 14:
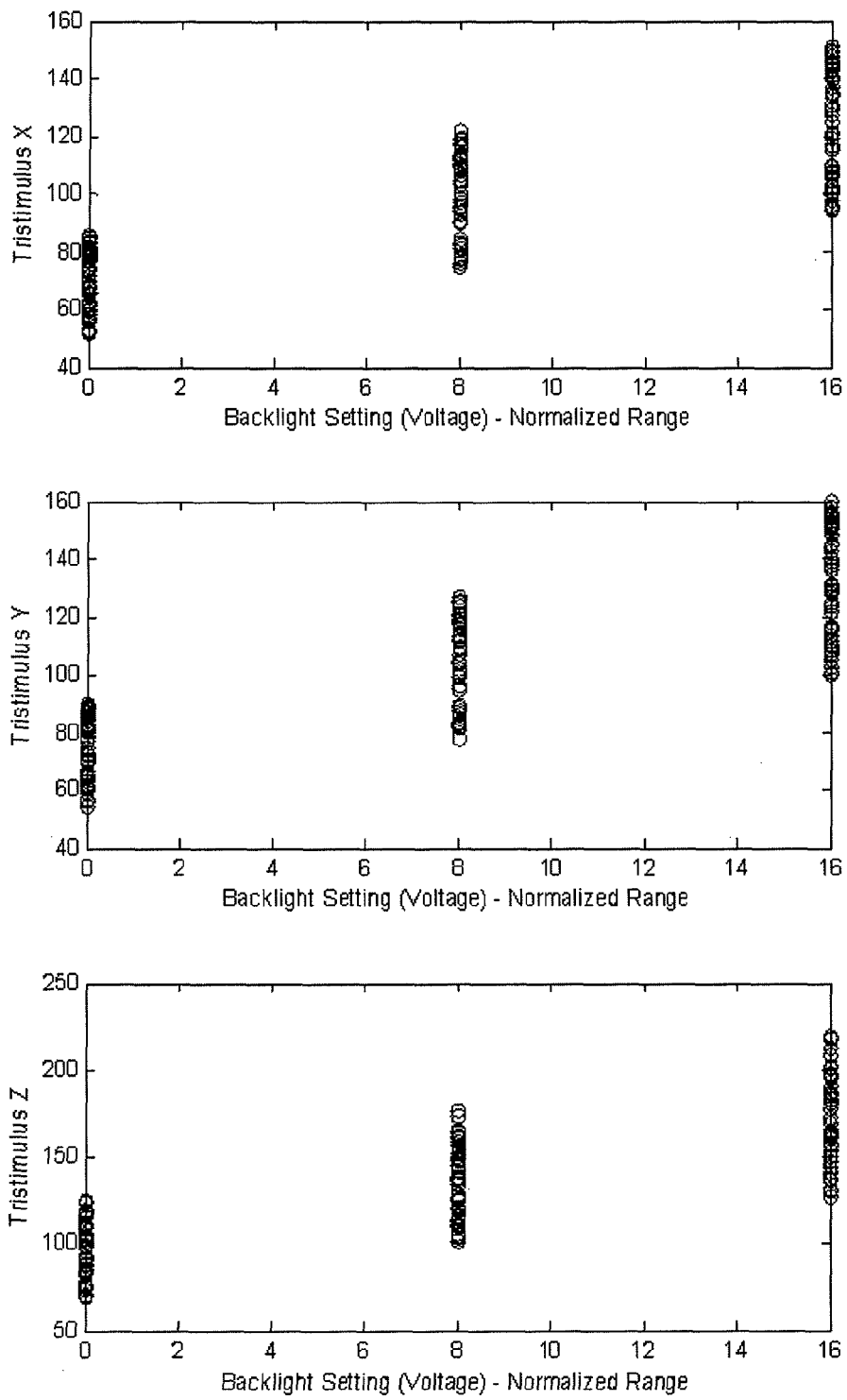
FIG. 14 is a plot of the measured tristimulus values XYZ for the grid points of FIG. 9 as a function of the backlight voltage setting for the grey level 255 (pure white). The voltage values are in a normalized range.
Figure 15:
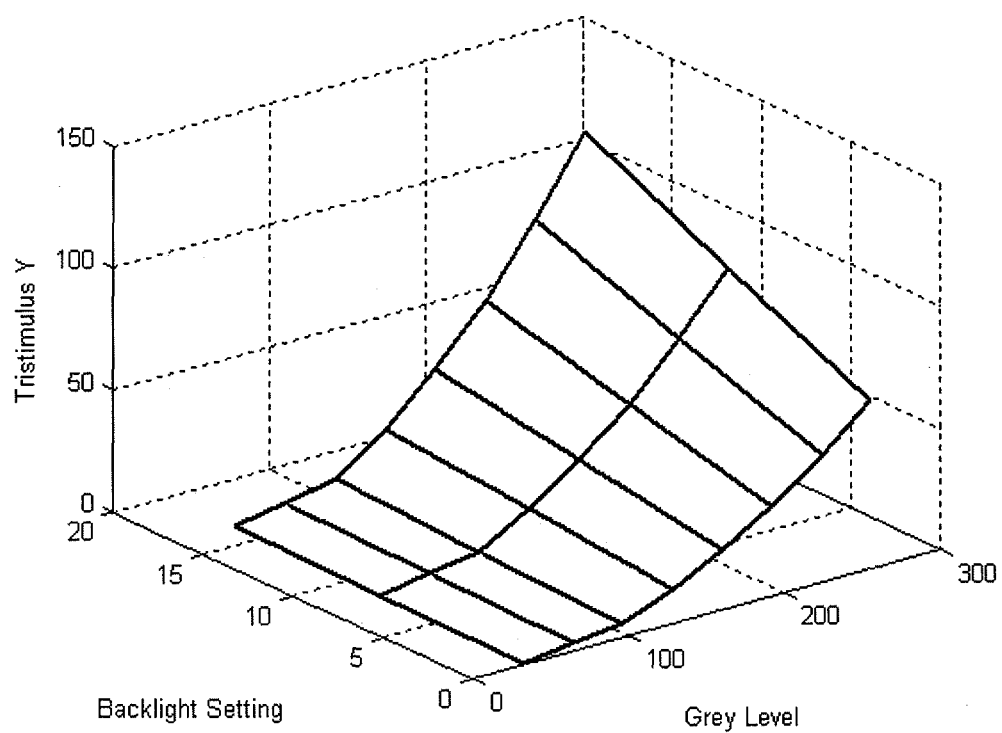
FIG. 15 is a 3D plot of tristimulus value Y (luminance) as a function of both the backlight voltage settings and grey level signals.

For varying backlight voltage settings, example results can be seen in the plots of FIGS. 13 and 14, at the same 7×7 pixel positions, for tristimulus values of grey levels 192 and 255 respectively. The voltage control was set to [0, 8, 16]. As discussed in (21), the same setting is applied to all LEDs. Once again, the non-uniformity is seen as vertically displaced tristimulus values for the pixel positions at a given setting. Unlike the variation across pixel values (FIGS. 10 to 12), the variation in voltage space appears very linear. This is a common behavior of LCD backlight units and can be utilized to simplify the response computation. FIG. 15 shows variation of luminance Y as a function of both pixel value (for pure grey levels) and backlight setting—the points have been connected by a mesh. The power form in pixel space and linear from in voltage space is clearly seen.

With the physical measurements completed, the next step is reconstructing the display response 43 and determining the response functions 44. This essentially means converting the discrete measured grid data 42 to functional form (11), so that the correction can be computed for all levels, all LED voltage settings and all pixel positions. The different response functions 44 are first defined. Each physical quantity XYZ, has an independent response function 44 (i=X,Y,Z):

$$F_i(x,y,\vec{C},\vec{V}) \tag{24}$$

The response function 44 can be decoupled into two components. From the architecture on an LCD display, as shown in FIG. 1, the backlight panel 10 and the LC panel 16 function in series. The backlight panel 10, being the light source, produces a light front incident 14 onto the LC panel 16, which is then modified by the pixel values. The final response is a product of the light from the backlight and the modulation by the pixels. This means that the response can be written as product of the backlight response $F_i^L$ and pixel response $F_i^P$ wherein the former depends on the voltage and the latter depends on the level:

$$F_i(x,y,\vec{C},\vec{V}) = F_i^P(x,y,\vec{V}) \times F_i^P(x,y,\vec{C}) \tag{25}$$

Furthermore, the product form of (25) implies that the response can be studied at a fixed voltage, and then these fixed voltage responses "connected" functionally in the voltage parameter. The connection can be made at the correction stage. Thus the responses required are for each dataset at a given voltage:

$$F_i(x,y,\vec{C}), \text{ computed for each setting of } \vec{V} \tag{26}$$

Further reduction is possible by making use of the fact that each pixel behaves independently in an LCD display and is not affected by neighboring pixels. The correction at a given pixel only depends on the response at that pixel. Therefore, the responses and correction can be computed for all pixels independently. The (x, y) dependence of the response can be dropped with the understanding that the following steps are computed at every measured pixel position:

$$F_i(\vec{C}), \text{ computed for every measured pixel position } (x_a, y_a) \text{ and each setting of } \vec{V} \tag{27}$$

Next the superposition principle can be employed to further simplify the response form. According to eq. (17), the XYZ response for any RGB color is a sum of the component responses for R, G and B. Let $F_i^j$ be the response function 44 for measured quantity $i \in \{X,Y,Z\}$, as a result of applying a pure level of $j \in \{R,G,B\}$. Then (27) implies:

$$F_i(\vec{C}) = F_i^R(R) + F_i^G(G) + F_i^B(B), i \in \{X,Y,Z\}$$

$F_i^R$—Red component response functions $F_i^G$—Green component response functions $F_i^B$—Blue component response functions (28)

Determining the response functions 44 is thus reduced to finding the 9 functions $F_i^j$, which follow the data described by the $2^{nd}$ to $4^{th}$ plots in FIGS. 10 to 12. These responses are at a fixed backlight setting and are also referred to as the pixel responses as they give the dependence on the pixel color level. In the special case where luminance correction of only grey levels (W=R=G=B) is required, (28) simplifies to a single function:

$$F_Y(\vec{C}) = F_Y^W(W), \vec{C} = (W,W,W) \tag{29}$$

The function (29) will follow the grey level data in the first plot of FIG. 10. Luminance correction of grey-only levels is the most common requirement for non-uniformity correction in LCD displays, especially when speed and cost is of concern. In the unified approach of this invention, luminance-only correction is handled within the same framework. Analogous to grey level Y response, functions for X and Z can be defined $F_X^W(W)$, $F_Z^W(W)$, though these are of less use in practice. As mentioned, the voltage dependence is taken into account after the pixel dependence. This will require the backlight (voltage) dependence, i.e. the functions representing the data in FIGS. 13 to 14 at specific levels. We refer to these as the backlight responses. The backlight responses are represented as:

$X = F_X^V(V)$—X response to backlight setting $Y = F_Y^V(V)$—Y response to backlight setting $Z = F_Z^V(V)$—Z response to backlight setting (30)

Whereas the pixel responses are at a fixed voltage, the backlight responses are at a fixed color level. For the most common corrections, backlight response for pure white only (FIG. 14) or a small number of grey levels are used. The backlight response is determined at each pixel position $(x_a, y_b)$, analogous to the pixel response.

The simplification of the response functions 44 to (28) depends on the validity of the superposition equation (17). A black level offset due to light leakage is one factor that can break this equation, giving a superposition error. Another possible source of discrepancy is variations in the display RGB primaries or in the camera filters, from the ideal. Therefore it is important to adjust for these real variations before the responses are computed. To adjust for black level and other factors, the sum of the XYZ measured values for R, G and B, at each level, are compared with the XYZ measured values for the identical grey level (R=G=B=W), the differences due to non-ideal behavior, called the superposition deltas $(\Delta X_S, \ldots)$, are:

$$\Delta X_S = X_W - (X_R + X_G + X_B)$$

$$\Delta Y_S = Y_W - (Y_R + Y_G + Y_B)$$

$$\Delta Z_S = Z_W - (Z_R + Z_G + Z_B) \tag{31}$$

Figure 16:
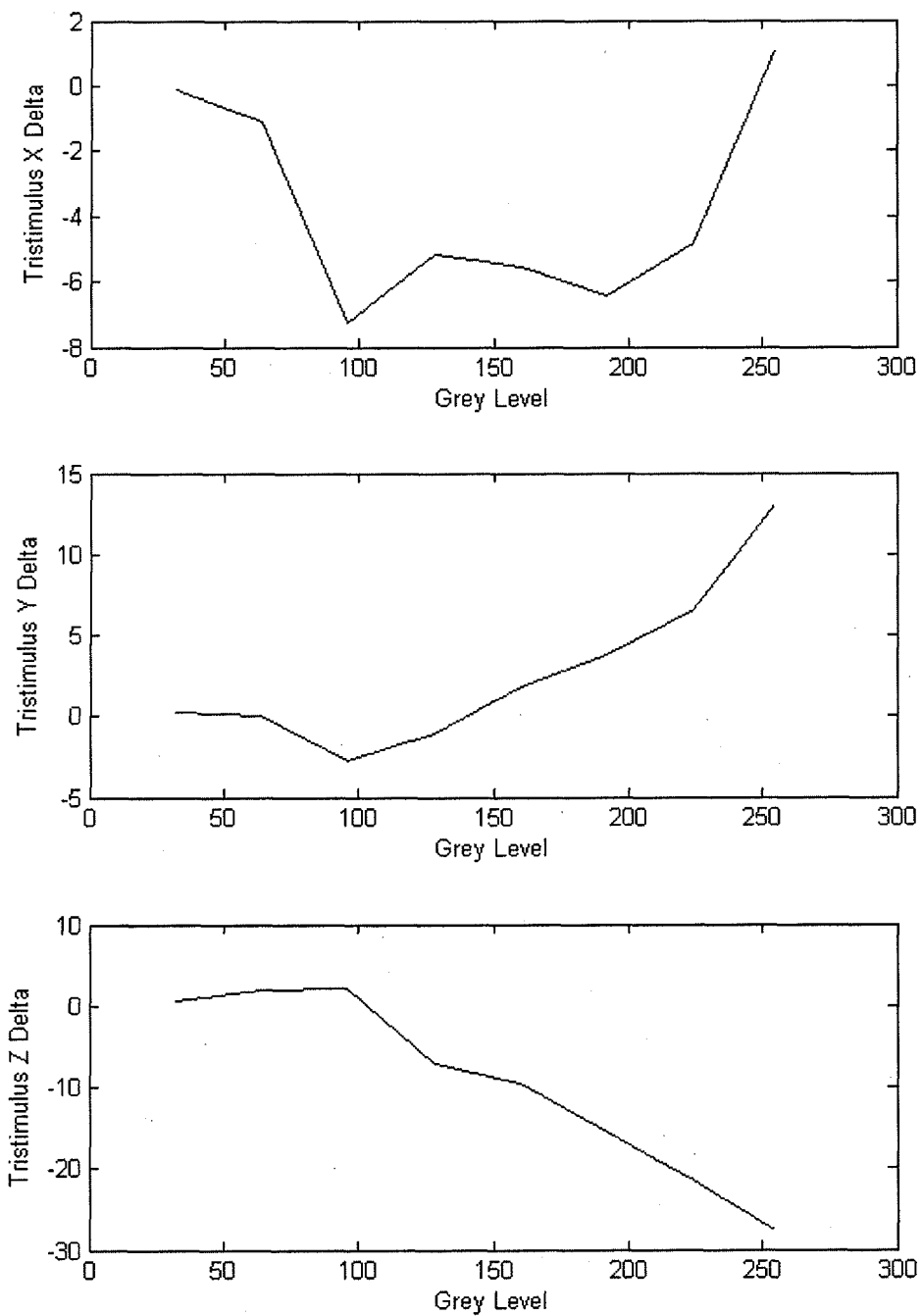
FIG. 16 is a plot of the differences (deltas) in tristimulus values, between those of a measured grey level, and those computed from the sum of the corresponding measured RGB levels.

The differences of tristimulus values are seen in FIG. 16, after averaging over a number of measured pixels. Overall, the deviation from ideal behavior is small, with the exception of Y and Z for high levels. When the pure R, G, and B responses are computed, the other 2 pixel components are off (set to 0), however light still leaks through the liquid crystals that are off. After adding the three responses, the light leakage (also referred to as the black level) has been incorrectly added 6 times, in comparison to the case where the corresponding grey level is computed. For luminance Y, the pure grey actually has a larger value than the sum, which is understandable since with all channels 0 simultaneously, the intensity recorded may be slightly higher. To correct for the superposition mismatch, the measured data is adjusted by the deltas so as to ensure a match of the R, G, B and W data. This correction can be written as:

$$X_i(\text{corrected}) = X_i - r_{Xi}\Delta X_S \quad (32)$$
$$Y_i(\text{corrected}) = Y_i - r_{Yi}\Delta Y_S$$
$$Z_i(\text{corrected}) = Z_i - r_{Zi}\Delta Z_S$$
$$\sum_i r_{Xi} = \sum_i r_{Yi} = \sum_i r_{Zi} = 1, i = R, G, B$$

The r-factors determine the spread of the superposition correction amongst the R, G, and B components, and can be made programmable. Setting them all to 0 implies no correction for superposition errors. As an example, the following spreading could be taken:

$$r_{XR} = 1, r_{XG} = r_{XB} = 0 \quad (33)$$
$$r_{YR} = r_{YG} = r_{YB} = \frac{1}{3}$$
$$r_{ZR} = r_{ZG} = 0, r_{XB} = 1$$

Figure 17:
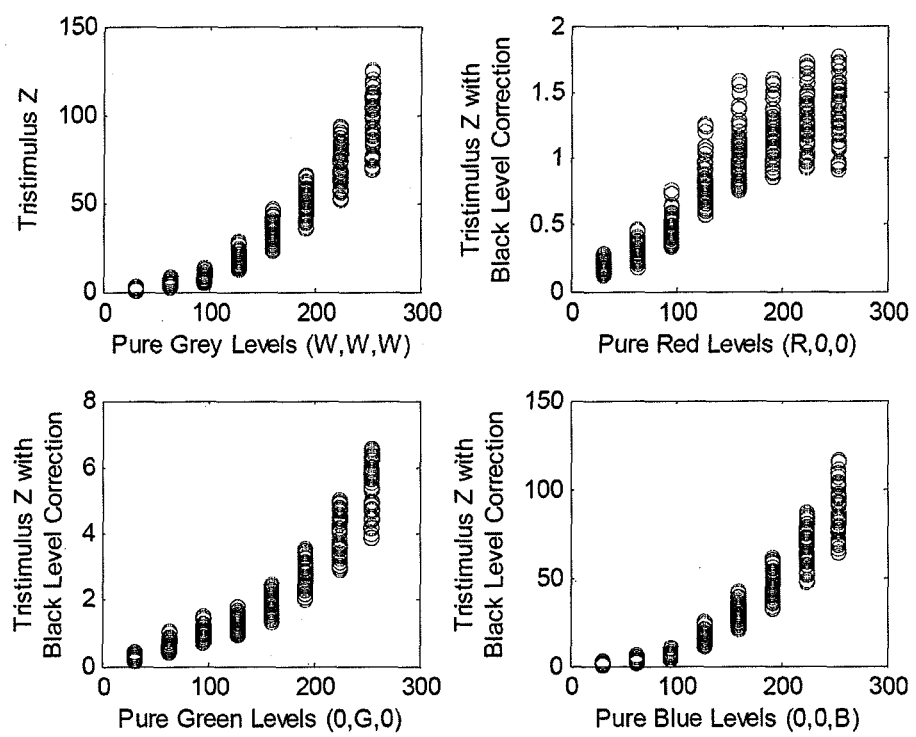
FIG. 17 is a plot of the tristimulus Z values with the superposition correction included.

This spreading is based on the fact that X and Z are more weighted towards R and B respectively, whereas Y is more symmetric about G. The data with the black level offset correction applied is shown in FIG. 17 for tristimulus Z, where the delta was largest. It may be that the correction leads to negative values for XYZ—these can be clipped to 0 or an alternatively spreading used to avoid negative values. In the following it is taken that the correction (33) has been made.

Having defined the various responses, the functions 44 can be computed using methods for data modeling. The two main methods relevant to the invention are: fitting or interpolation of data; and representing data using known mathematical models. However, it is understood that any data modeling method could also be used.

In the first method the data points are either fitted or interpolated by the response function 44. Fitting is preferred as it is less susceptible to measurement errors. Interpolation can be used if the data is known to be very accurate. In the current exemplary discussion, "least squares fitting" method is used to model the data. Commercial software packages are available that implement least squares fitting. The basis commonly used for the fit is a polynomial basis. In the present exemplary illustration, a cubic ($3^{rd}$ degree) polynomial fit to the data is made, but the degree is general (denoted d) in the equations. A variation of the fitting approach is to use a series of fitting functions; i.e. the response is locally represented by different fits. A piecewise linear function is an example. Since the correction at a given level is local (change is expected to be small), the function that best represents the response can be modified at different levels. A global function need not be used. A first polynomial may work best for a level (e.g. 255), but a different polynomial may be used for another level (e.g. 192).

The second method assumes a specific model based on known behavior of displays. This method is particularly useful if only a small number of data points are available or the data points are suspect. For LCD displays, the intensity is expected to behave as a power law. This lets one estimate the response functions 44 from as little as one measured level, at maximum red, green, blue or white. If the luminance at maximum white $W_{max}$ (255) is $Y_{max}$, then the response function (29) can be estimated using a power law function:

$$F_Y^W(W) = Y_{max}\left(\frac{W}{W_{max}}\right)^\gamma \quad (34)$$

The power value, referred to as gamma γ, is approximately 2.2. Real systems deviate from eq. (34), hence if accurate data is available a fit is preferred to be used. Nevertheless, eq. (34) or a similar mathematical model is often the best solution given the constraints of speed and limited measurements. In (34), the non-uniformity is implicit in the variation of $Y_{max}$ across pixels. A variable black offset $Y_0$ can also be added to the model in (34), which gives a model matched to W=255 and W=0.

The two methods can also be used in combination. It may be that correcting one level, better results are obtain with a fit, and at another level the power law is best.

Assuming the sufficient data available, cubic fits of the first method are made to determine the response functions 44. These have been plotted in FIG. 18 for the 7×7 pixel positions of the exemplary experiment, on top of the measured data for the luminance (tristimulus Y). The grey response functions $F_Y^W$ are on the first plot, the red $F_Y^R$ on the next plot, and so forth in clockwise order. The response function 44 can be written as:

$$F_i^R(R) = \Sigma_{n=0}^d a_{Rn}^i R^n$$

$$F_i^G(G) = \Sigma_{n=0}^d a_{Gn}^i G^n$$

$$F_i^B(B) = \Sigma_{n=0}^d a_{Bn}^i B^n$$

$$F_Y^W(W) = \Sigma_{n=0}^d a_{Wn}^Y W^n \quad (35)$$

Figure 19:
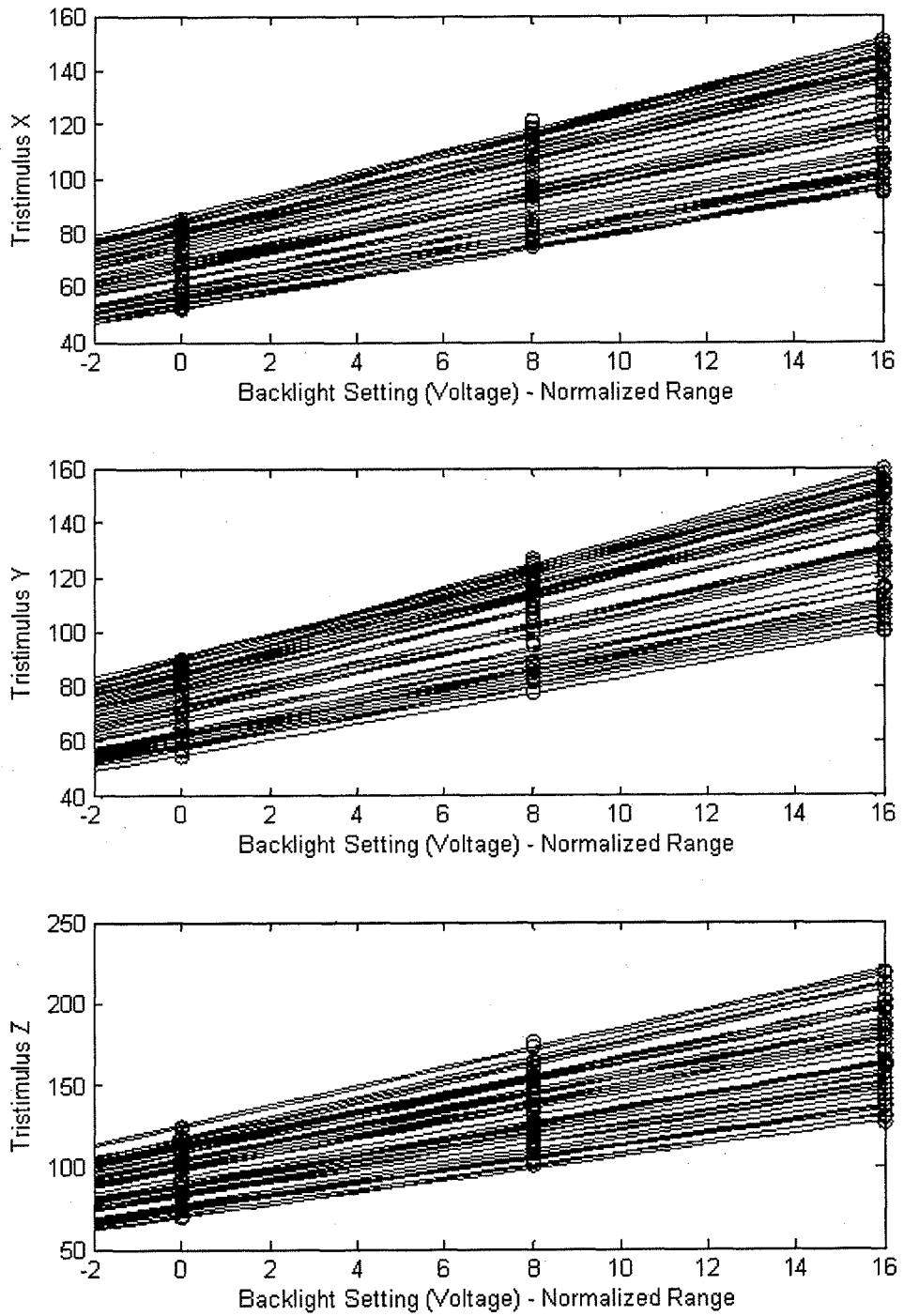
FIG. 19 is a plot of the computed backlight response functions for XYZ tristimulus values, for grey level 255 (pure white). The voltage values are in a normalized range.

These functions are computed at every measured pixel position ($x_a$, $y_b$). Similarly the backlight response functions are generated by fitting the data in FIGS. 13 to 14. The backlight responses of the tristimulus values XYZ for level 255 are shown in FIG. 19. Since the dependence is linear, a linear polynomial is used. These response functions can be written as:

$$F_X^V(V) = a_{V1}^X V + a_{V0}^X$$

$$F_Y^V(V) = a_{V1}^Y V + a_{V0}^Y$$

$$F_Z^V(V) = a_{V1}^Z V + a_{V0}^Z \quad (36)$$

The quantities $a_{Vn}^i$ are the linear fitting coefficients. These responses are also calculated at all measured pixel positions.

Figure 18:
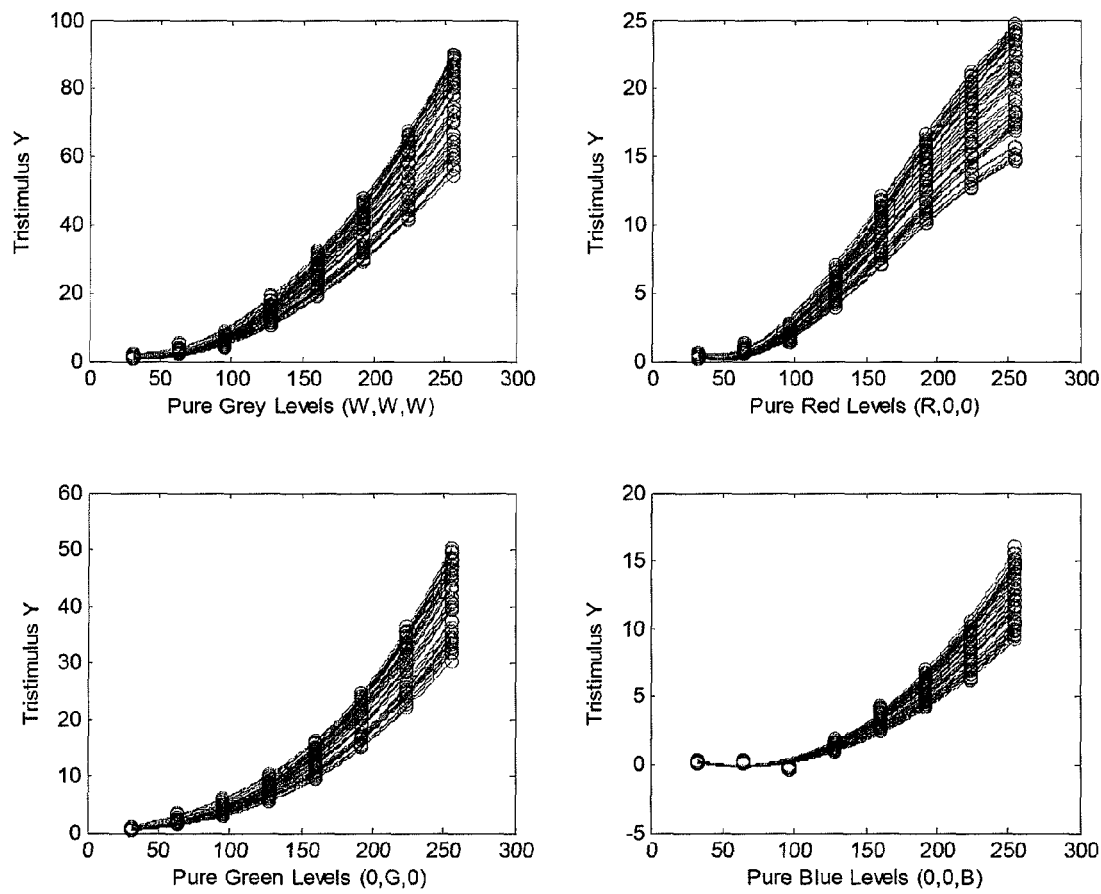
FIG. 18 is a plot of the computed pixel response functions for tristimulus value Y (luminance)

The global response functions shown in FIG. 18 are all strictly monotonic functions of the pixel value (increase with increasing pixel value), having a mathematical positive derivative. However it may be that a global monotonic function is not possible because the underlying data is not monotonic. This does happen for LCD displays, in particular at the low and high levels, where the data may be non-monotonic. Difficulty in capturing the data may also cause non-monotonic data. The Z tristimulus data for red in FIG. 17 shows such non-monotonicity. Depending on the extent of the non-monotonicity in relation to the function value, it can make computing the correction difficult and lead to erroneous results. There are possible resolutions, if non-monotonicity becomes an issue. One is to define the response functions locally in RGB space, where it is monotonic, as opposed to globally, and then solve for the correction in the vicinity of the level being corrected. This is acceptable provided the correction value also lies in this monotonic vicinity. A second possibility is to shift and scale the global response function so as to make it monotonic. This is acceptable if the shift/scale does not make the response deviate significantly from the true data. Taking the Z tristimulus for R as an example, let the global maximum and global minimum values of the response be denoted $Z_{max}$ and $Z_{min}$, occurring at $R_{Zmax}$ and $R_{Zmin}$ respectively. The shifted and scaled response $\tilde{F}_Z^R$ is given by:

$$\tilde{F}_Z^R(R) = F\left(R\left(\frac{R_{Zmax} - R_{Zmin}}{R_{max}}\right) + R_{Zmin}\right) \tag{37}$$

$$\tilde{F}_Z^R(0) = Z_{min}$$

$$\tilde{F}_Z^R(R_{max}) = Z_{max}$$

In this example, $R_{max} = 255$ the maximum 8 bit pixel value. This assumes no local maxima/minima between the global maxima/minima, which is usually the case. The function (37) can be normalized to values of $Z_0$ and $Z_1$ at 0 and $R_{max}$ by:

$$\tilde{F}_Z^R(R) = \left(\frac{Z_1 - Z_0}{Z_{max} - Z_{min}}\right)\left(F\left(R\left(\frac{R_{Zmax} - R_{Zmin}}{R_{max}}\right) + R_{Zmin}\right) - Z_{min}\right) + Z_0 \tag{38}$$

$$\tilde{F}_Z^R(0) = Z_0$$

$$\tilde{F}_Z^R(R_{max}) = Z_1$$

This is sometimes useful in computation to bring the data at $R=0$ to 0. In what follows, any adjustments for non-monotonicity are assumed to be implemented if necessary and the same notation is used.

The response functions (35) and (36) fully characterize the display for all levels and backlight settings. The next step, the re-calibration stage 45, is to use these responses to build the correction grid 46. The correction grid provides a new set of RGB values at each measured point, which would result in physical quantities or responses that are constant in (x, y), i.e. uniform across the display. The measured values will only depend on the level $\vec{C}$ and backlight setting $\vec{V}$ (see eq. (10)).

The uniform values sought are computed from the measured data. The most common selections are to take the average, the minimum or maximum. Let $M_{ab}$ denote any measured quantity $\{X,Y,Z,x_c,y_c\}$, measured at pixel position $(x_a, y_b)$, then the required uniform quantities can be written as:

$$\text{Average: } \overline{M} = \frac{1}{N_x \times N_y} \sum_{a=1}^{N_x} \sum_{b=1}^{N_y} M_{ab} \tag{39}$$

-continued $$\text{Minimum: } \overline{M} = \min(\{M_{ab}\}), a = 1 \ldots N_x, b = 1 \ldots N_y$$

$$\text{Maximum: } \overline{M} = \max(\{M_{ab}\}), a = 1 \ldots N_x, b = 1 \ldots N_y$$

These quantities are computed for each level $\vec{C}=(R,G,B)$ and voltage $\vec{V}$, however to keep the notation simple, this dependence is not explicitly shown. In the examples presented, the average and minimum values will be used. The bar notation $\{\overline{X},\overline{Y},\overline{Z},\overline{x}_c,\overline{y}_c\}$ will denote the uniform values sought by the correction.

For a fixed voltage, the re-calibration step 45 is formulated as follows. Given a fixed level $\vec{C}=(R,G,B)$ (or $\vec{C}=(W,W,W)$ for luminance correction of grey levels only), find the new pixel value $\vec{C}'=(R',G',B')$ (or W'), dependent on the position, which results in a uniform response, independent of position. Note that the level being corrected need not be one of the levels that were measured (18), since the response for all RGB values has been computed in (35). In mathematical terms, a solution is required to the following system of non-linear equations:

I) Luminance+Color Correction for General Level:

$(R,G,B) \rightarrow (R',G',B')$ $$R'=R+\Delta_R, \; G'=G+\Delta_G, \; B'=B+\Delta_B \tag{40}$$

$$\overline{X} = \sum_n {}_0^d a_{Rn}^X R'^n + \sum_n {}_0^d a_{Gn}^X G'^n + \sum_n {}_0^d a_{Bn}^X B'^n$$

$$\overline{Y} = \sum_n {}_0^d a_{Rn}^Y R'^n + \sum_n {}_0^d a_{Gn}^Y G'^n + \sum_n {}_0^d a_{Bn}^Y B'^n$$

$$\overline{Z} = \sum_{n=0}^d a_{Rn}^Z R'^n + \sum_{n=0}^d a_{Gn}^Z G'^n + \sum_{n=0}^d a_{Bn}^Z B'^n \tag{41}$$

II) Luminance Correction for Grey Level Only:

$$W \rightarrow W' \tag{42}$$

$$\overline{Y} = \sum_n {}_0^d a_{Wn}^Y W'^n \tag{43}$$

The (x, y) spatial dependence is implicit in that the coefficients depend on (x, y), i.e. the above system is solved for every pixel position $(x_a, y_b)$. The new values (R',G',B') are expected to differ not significantly from (R,G,B). The notation $(\Delta_R, \Delta_G, \Delta_B)$ denotes the change in pixel value, in terms of which the equation system can also be expressed and solved. For LCDs, it is standard practice to report luminance and chromaticity $(x_c,y_c,Y)$, instead of XYZ. Both descriptions are equivalent and conversion between the two is handled via eq. (3). Similar expressions for (41) in terms of $x_c y_c Y$ are:

$$\overline{x}_c = \frac{\sum_{m=1}^{3} \sum_{n=0}^{d} a_{mn}^X (C_m')^n}{\sum_{i\,X,Y,Z} \sum_{m=1}^{3} \sum_{n=0}^{d} a_{mn}^i (C_m')^n} \tag{44}$$

$$\overline{y}_c = \frac{\sum_{m=1}^{3} \sum_{n=0}^{d} a_{mn}^Y (C_m')^n}{\sum_{i\,X,Y,Z} \sum_{m=1}^{3} \sum_{n=0}^{d} a_{mn}^i (C_m')^n}$$

$$\overline{Y} = \sum_{m=1}^{3} \sum_{n=0}^{d} a_{mn}^Y (C_m')^n$$

Wherein the m=1, 2, 3 index corresponds to R, G, B respectively, $C_1'=R'$, $C_2'=G'$ and $C_3'=B'$, and $(\bar{x}_c, \bar{y}_c)$ are defined analogous to (39) using (3). In the case of using averages, one has:

$$\bar{x}_c = \frac{1}{N_x \times N_y} \sum_{a=1}^{N_x} \sum_{b=1}^{N_y} \frac{X_{ab}}{X_{ab} + Y_{ab} + Z_{ab}} \quad (45)$$

$$\bar{y}_c = \frac{1}{N_x \times N_y} \sum_{a1}^{N_x} \sum_{b1}^{N_y} \frac{Y_{ab}}{X_{ab} + Y_{ab} + Z_{ab}}$$

The expressions on the right hand side of (45) can be viewed as "response" functions for the chromaticities, however they do not follow the simple superposition (addition) principle in terms of the component RGB chromaticities. Hence the approach presented here, whereby response functions are defined in terms of XYZ, and chromaticities computed afterwards, is a more efficient and tractable method. Both equations (41) and (44) define a system of three non-linear equations that need to be solved for (R',G',B'). This will give the correction grid 46 once computed for all positions, levels and voltages.

An alternative formulation (of (41) and (43)) can be written directly in terms of the XYZ tristimulus values. First define the inverse response functions:

$$f_c^X \equiv (F_X^c)^{-1}, f_c^Y \equiv (F_Y^c)^{-1}, f_c^Z \equiv (F_Z^c)^{-1}, c=R,G,B \quad (46)$$

These are the inverses of the responses (35), and can be computed by inverting (35), or by fitting RGB levels as a function of measured XYZ instead of measured XYZ as a function of RGB levels. Also using the notation (C=R,G,B):

$X_C$: Measured $X$ value for component $C$ at level $C \equiv F_X^C(C)$ $X_C'$: Required $X$ value for component $C$ at level $C$ for uniformity $Y_C$: Measured $Y$ value for component $C$ at level $C \equiv F_Y^C(C)$ $Y_C'$: Required $Y$ value for component $C$ at level $C$ for uniformity $Z_C$: Measured $Z$ value for component $C$ at level $C \equiv F_Z^C(C)$ $Z_C'$: Required $Z$ value for component $C$ at level $C$ for uniformity (47)

The system of equations (41) become:

$\bar{X} = X_R' + X_G' + X_B'$ $\bar{Y} = Y_R' + Y_G' + Y_B'$ $\bar{Z} = Z_R' + Z_G' + Z_B'$ $0 = f_R^X(X_R') - f_R^Y(Y_R')$ $0 = f_R^Y(Y_R') - f_R^Z(Z_R')$ $0 = f_G^X(X_G') - f_G^Y(Y_G')$ $0 = f_G^Y(Y'G) - f_G^Z(Z_G')$ $0 = f_B^X(X_B') - F_B^Y(Y_B')$ $0 = f_B^Y(Y_B') - f_b^Z(Z_B')$ (48)

This is a system of nine non-linear equations for nine unknowns $(X_C', Y_C', Z_C')$. The last six set of equations impose the constraint that the real independent variables are still RGB, hence the inverse responses must equal. Having solved (48), the new RGB values are given by:

$R' = f_R^X(X_R') = f_R^Y(Y_R') = f_R^Z(Z_R')$ $G' = f_G^X(X_G') = f_G^Y(Y_G') = f_G^Z(z_G')$ $B' = f_B^X(X_B') = f_B^Y(Y_B') = f_B^Z(Z_B')$ (49)

Equations in terms of chromaticity coordinates, analogous to (48), can also be obtained. Since this formulation hides the RGB dependence, it is preferred to work with (41) and (43) instead. Nevertheless, it should be noted that both are equivalent.

Equation (41) describes a system of 3 non-linear equations in 3 variables and can be solved using known non-linear numerical optimization routines. This however is not easily implemented for real-time computation. By using an appropriate linear approximation, (41) can be converted to a linear system that can be quickly solved. Recall that (41) needs to be solved for each level being corrected. The new values are expected to be in the neighborhood of the level being corrected. In particular, the deltas $(\Delta_R, \Delta_G, \Delta_B)$, should be small, and the response functions can be locally approximated as linear functions in the deltas. Thus for correcting level (R,G,B), expand the responses as:

$$F_i^R(R') = \sum_{n=0}^{d} a_{Rn}^i (R + \Delta_R)^n \approx \sum_{n=0}^{d} a_{Rn}^i R^n \left(1 + n\frac{\Delta_R}{R}\right) = \quad (50)$$

$$\sum_{n=0}^{d} a_{Rn}^i R^n + \Delta_R \sum_{n=0}^{d} a_{Rn}^i R^{n-1} n$$

$$F_i^G(G') = \sum_{n=0}^{d} a_{Gn}^i (G + \Delta_G)^n \approx \sum_{n=0}^{d} a_{Gn}^i G^n \left(1 + n\frac{\Delta_G}{G}\right) =$$

$$\sum_{n=0}^{d} a_{Gn}^i G^n + \Delta_G \sum_{n=0}^{d} a_{Gn}^i G^{n-1} n$$

$$F_i^B(B') = \sum_{n \, 0}^{d} a_{Bn}^i (B + \Delta_B)^n \approx \sum_{n \, 0}^{d} a_{Bn}^i B^n \left(1 + n\frac{\Delta_B}{B}\right) =$$

$$\sum_{n \, 0}^{d} a_{Bn}^i B^n + \Delta_B \sum_{n \, 0}^{d} a_{Bn}^i B^{n-1} n$$

Equation (41) then becomes a 3×3 linear system of equations:

$$A_{XYZ} \times \vec{\Delta} = \vec{b}_{XYZ} \quad (51)$$

Where:

$$\bar{\Delta} = \begin{pmatrix} \Delta_R \\ \Delta_G \\ \Delta_b \end{pmatrix} \quad (52)$$

$$X = \sum_{n=0}^{d} a_{Rn}^X R^n + \sum_{n=0}^{d} a_{Gn}^X G^n + \sum_{n=0}^{d} a_{Bn}^X B^n$$

$$Y = \sum_{n \, 0}^{d} a_{Rn}^Y R^n + \sum_{n \, 0}^{d} a_{Gn}^Y G^n + \sum_{n \, 0}^{d} a_{Bn}^Y B^n$$

-continued
$$Z = \sum_{n=0}^{d} a_{Rn}^{Z} R^n + \sum_{n=0}^{d} a_{Gn}^{Z} G^n + \sum_{n=0}^{d} a_{Bn}^{Z} B^n$$

$$\vec{b}_{XYZ} = \begin{pmatrix} \overline{X} - X \\ \overline{Y} - Y \\ \overline{Z} - Z \end{pmatrix},$$

$$A_{XYZ} = \begin{pmatrix} \sum_{n\,0}^{d} a_{Rn}^{X} R^{n-1} n & \sum_{n\,0}^{d} a_{Gn}^{X} G^{n-1} n & \sum_{n\,0}^{d} a_{Bn}^{X} B^{n-1} n \\ \sum_{n\,0}^{d} a_{Rn}^{Y} R^{n\,1} n & \sum_{n\,0}^{d} a_{Gn}^{Y} G^{n\,1} n & \sum_{n\,0}^{d} a_{Bn}^{Y} B^{n\,1} n \\ \sum_{n=0}^{d} a_{Rn}^{Z} R^{n-1} n & \sum_{n=0}^{d} a_{Gn}^{Z} G^{n-1} n & \sum_{n=0}^{d} a_{Bn}^{Z} B^{n-1} n \end{pmatrix}$$

This is solved by inverting matrix A, giving the new RGB values as:

$$\vec{C}' = \vec{C} + \vec{\Delta} = \begin{pmatrix} R \\ G \\ B \end{pmatrix} + A_{XYZ}^{-1} \vec{b}_{XYZ} \tag{53}$$

Linear approximation to the chromaticity based equation (44) can also be computed, where (44) becomes:

$$A_{xyY} \times \vec{\Delta} = \vec{b}_{xyY} \tag{54}$$

where:

$$\Delta x_c = \overline{x}_c - \frac{X}{X+Y+Z} \tag{55}$$

$$\Delta y_c = \overline{y}_c - \frac{Y}{X+Y+Z}$$

$$\Delta Y = \overline{Y} - Y$$

$$I = X + Y + Z,$$

$$I_m = \sum_{i=X,Y,Z} \sum_{n\,0}^{d} a_{mn}^{i} (m)^{n\,1} n,$$

$$m = R, G, B$$

$$I_{Xm} = \sum_{n=0}^{d} a_{mn}^{X} (m)^{n-1} n,$$

$$I_{Ym} = \sum_{n=0}^{d} a_{mn}^{Y} (m)^{n-1} n$$

$$\vec{b}_{xyY} = \begin{pmatrix} -\Delta x_c \times I^2 \\ -\Delta y_c \times I^2 \\ \Delta Y \end{pmatrix}$$

$$A_{xyY} = \begin{pmatrix} (I\Delta x_c + X)I_R - I_{XR}I & (I\Delta x_c + X)I_G - I_{XG}I & (I\Delta x_c + X)I_B - I_{XB}I \\ (I\Delta x_c + Y)I_R - I_{YR}I & (I\Delta x_c + Y)I_G - I_{YG}I & (I\Delta x_c + Y)I_B - I_{YB}I \\ \sum_{n=0}^{d} a_{Rn}^{Y} R^{n\,1} n & \sum_{n=0}^{d} a_{Gn}^{Y} G^{n\,1} n & \sum_{n=0}^{d} a_{Bn}^{Y} B^{n\,1} n \end{pmatrix}$$

All quantities in $A_{xyY}$ and $\vec{b}_{xyY}$ are known, and again the solution is obtained by inverting the matrix:

$$\vec{C}' = \vec{C} + \vec{\Delta} = \begin{pmatrix} R \\ G \\ B \end{pmatrix} + A_{xyY}^{-1} \vec{b}_{xyY} \quad (56)$$

Either the XYZ based solution (53) or $x_c y_c Y$ based solution (56) may be used. The RGB values obtained will differ slightly due to the fact that $(\bar{x}_c, \bar{y}_c)$ and the chromaticity values computed from $(\bar{X}, \bar{Y}, \bar{Z})$ will in general not be identical. However the differences will be small and of the two solutions, the one leading to better uniformity can be used. In the current exemplary illustration, solution (56) will be used since the color uniformity requirement is normally defined in terms of chromaticity coordinates as opposed to XZ values.

The equations derived provide the full correction, for both brightness and color. If only brightness for grey levels is to be corrected, which is often sufficient for many consumer displays, then the re-calibration step 44 is simplified to solving (43) only. This is a single non-linear equation in a single variable, and can be solved using standard polynomial root solving routines. Alternatively, one can fit W as a function of Y, that is the inverse response $f_W{}^Y \equiv (F_Y{}^W)^{-1}$ analogous to (46), and directly read the W' value by evaluating $f_W{}^Y(W')$. Care needs to be taken with monotonicity and finding solutions outside the domain. A further simplification is obtained if the response is as in (34), then an explicit formula for the re-calibration step 44 can be obtained:

$$W' = W_{max} \left( \frac{Y}{Y_{max}} \right)^{\frac{1}{\gamma}} \quad (57)$$

For scenarios where speed is critical and data is limited, eq. (57) provides a quick approximate solution for correcting grey level luminance.

The solutions (56) are computed for all levels being corrected at all pixel positions $(x_a, y_b)$. For each corrected level, this provides a set of grid points, called the correction grid 46, in (x, y) space, which are denoted as:

$$\{(R_{\vec{C}ab}', G_{\vec{C}ab}', B_{\vec{C}ab}')\} \quad (58)$$

The $\vec{C}ab$ subscripts indicates that this is the corrected RGB value for input color (level) $\vec{C}$ at position $(x_a, y_b)$. For a pure grey level luminance correction one similarly has the correction grid:

$$\{W_{Wab}'\} \quad (59)$$

Figure 20:
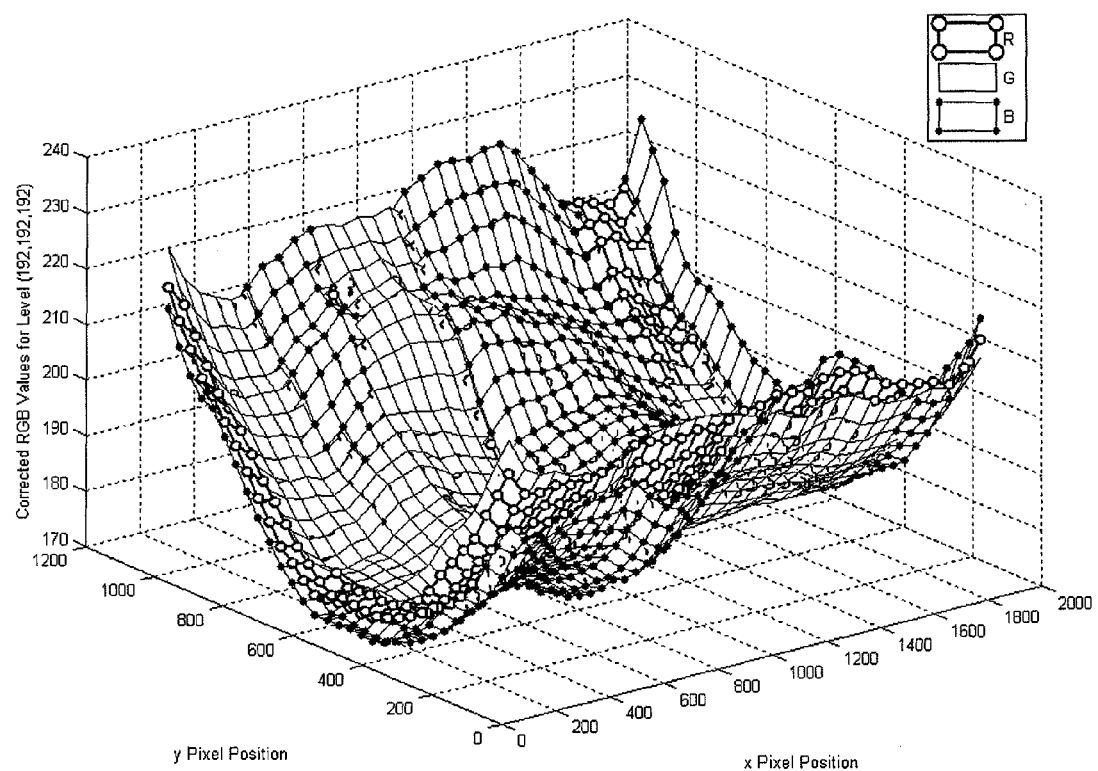
FIG. 20 is a 3D plot of the corrected RGB values for grey level 192, as a function of the pixel positions. Each of R, G and B is plotted as a separate surface, with the legend shown at the top right.
Figure 21:
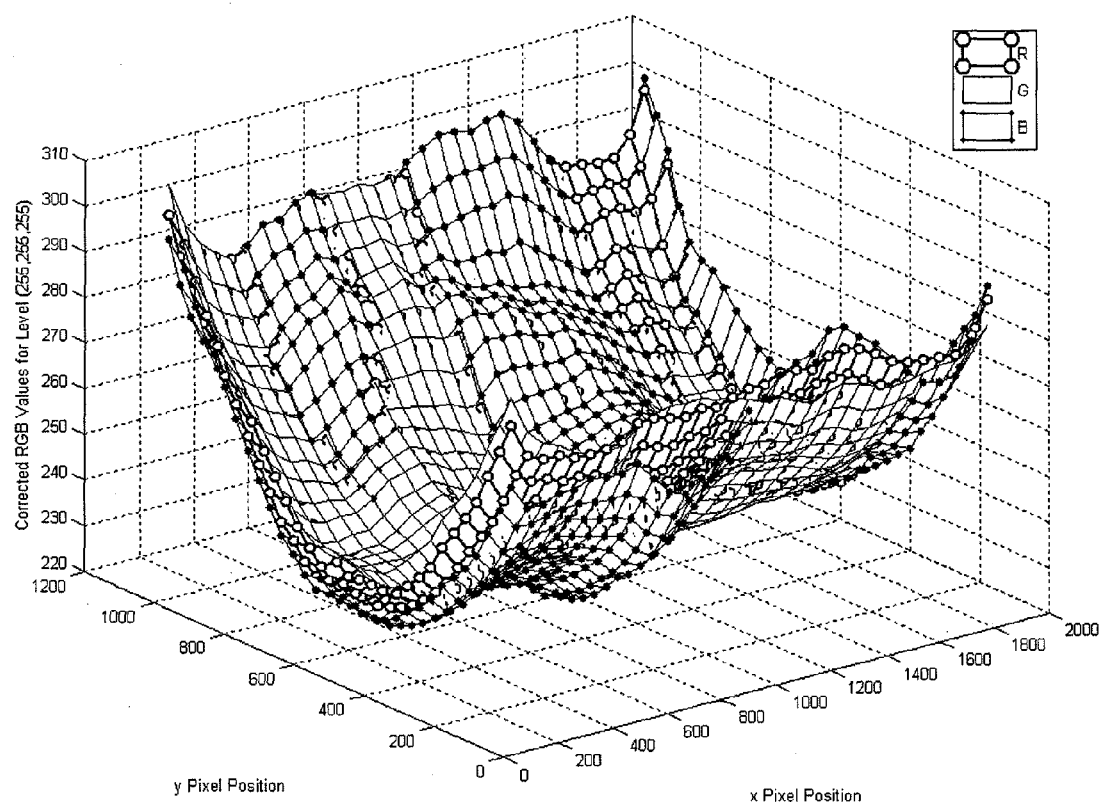
FIG. 21 is a 3D plot of the corrected RGB values for grey level 255, as a function of the pixel positions. Each of R, G and B is plotted as a separate surface, with the legend shown at the top right.

The subscript W in (59) indicates the grey level (W,W,W). Each component (RGB) will plot as a 2D surface over (x, y) space for each corrected level. In practice, majority (>90%) of brightness and color correction focuses on correcting grey levels. Thus the illustration in FIGS. 6 to 8 was for a grey level, namely (192,192,192). For the same LCD display, FIGS. 20 and 21 illustrate the correction R, G and B grids at grey levels 192 and 255, for 31×31 evenly space points. These are computed using equation (56). The R surface has a 'o' marker, the G surface a no marker and the B surface a '-' marker. The average values were used for the uniformity computation. Comparing the surface shape for level 192, with the XYZ surfaces in FIG. 7, we see that the RGB surfaces are essentially "inverses" to the XYZ surfaces.

In the exemplary embodiment described so far, all computations have been performed at a fixed backlight setting applied to all light source components (e.g. individual LEDs), also called the common or initial backlight setting. Therefore, the correction has been a pure pixel correction, with only the digital signal values being modified. If this is sufficient to obtain the required uniformity, then the backlight voltage need not be adjusted. For level 192 (FIG. 20), this is sufficient as all new pixel values are within the 8 bit range [0 . . . 255]. However for level 255, as seen from the FIG. 21, a pure pixel correction requires that many pixels, away from the center, have their digital values go outside the 8 bit range (>255). These correspond to regions where the display is less bright. Since this is not possible for an 8 bit display (values will be clipped to 255), uniformity correction will not be possible by only adjusting pixel values at high grey levels. One resolution is to take the minimum values in (39) for the uniform quantities. If dealing with $x_c y_c Y$, then only the minimum for the luminance Y is required. This will cause the pixel values to be brought down to match those of the less bright pixels. This solution may be acceptable if the loss in brightness is not great. If however the average brightness is to be maintained at high grey levels, it will be necessary to adjust the backlight. A similar issue can occur at low grey levels, in particular level 0, where the correction grid may send some pixel values less than 0, again not possible for an LCD display. These would correspond to regions where the display is brighter. In this scenario, a possible resolution is to take the maximum values in (39) at the cost of increasing the black level. Increasing black level is not preferred as it reduces the contrast ratio. Another possibility is to omit the dark levels in the correction, also not an ideal solution. However with individual LED control, both the black level and correction can be maintained by dimming the LEDs. The LED adjustments from levels 255 and 0 will result in a backlight correction, whereby the LEDs have their voltages modified—a "voltage correction grid". If individual LEDs are not adjustable, with only a global backlight adjustment possible, then the voltage correction can be based on the maximum change required (by considering all out of range pixels) for uniformity at either level 255 or level 0. The general case of local LED control is considered first.

In case of the backlight adjustment, a backlight correction is required that proceeds as embodied herein. The correction is made at a specific voltage level V, which is also called the input or global backlight setting, or simply backlight setting, and may be in some normalized units. The common voltage V is applied to all pixels. The pixel correction (58 or 59 as an approximation) is determined for grey levels 255 and 0 at backlight setting V. If there are no pixels out of range, then the backlight correction is an identity, i.e. the voltage is not modified from V. Note this would depend on what uniformity metrics were used from (39). From the computed values (58), those points at which the RGB component values go out of range are identified. These are labeled as (using 8 bit values as an example):

Level $\vec{C} = (0,0,0) : (x_a^0, y_b^0) \in \{(x_a, y_b), a=1 \ldots N_x, b=1 \ldots N_y\}$ such that one or more of the following: $R_{\vec{C}ab}' < 0$, $G_{\vec{C}ab}' < 0$, $B_{\vec{C}ab}' < 0$ Level $\vec{C} = (255,255,255) : (x_a^{255}, y_b^{255}) \in \{(x_a, y_b), a=1 \ldots N_x, b=1 \ldots N_y\}$ such that any one or more of following:
$R_{\vec{C}ab}' > 255, G_{\vec{C}ab}' > 255, B_{\vec{C}ab}' > 255$ \quad (60)

The required uniformity levels, also used in computing (60), will be labeled as $\overline{Y}^0$, $\overline{Y}^{255}$ for level 0 and 255 respectively, and so forth for other quantities. The positions for levels 0 and 255 will usually not coincide.

Next the backlight response functions (36) (shown in FIG. 19), for those pixel identified in (60), are used to determine the required voltages. The required voltages are given by solving:

$$At(x_a^0, y_b^0): \overline{Y}^0 = F_Y^V(V)$$

$$At(x_a^{255}, y_b^{255}): \overline{Y}^{255} = F_Y^V(V) \quad (61)$$

Increasing the voltages leads to increasing luminance, with minor changes in chromaticity if any; hence we consider only the Y values in determining the new voltage levels. The solutions, denoted $\{V_{a\overline{b}}^0, V_{a\overline{b}}^{255}\}$, are:

$$V_{a\overline{b}}^0 = \frac{\overline{Y}^0 - a_{V0a\overline{b}}^Y}{a_{V1ab}^Y} \quad (62)$$

$$V_{a\overline{b}}^{255} = \frac{\overline{Y}^{255} - a_{V0a\overline{b}}^Y}{a_{V1ab}^Y}$$

Note the response functions depend on the pixel positions, and we have added additional labels to the function coefficients to indicate this. Also the backlight responses for levels 0 and 255 need to be used when solving for $V_{a\overline{b}}^0$, and $V_{a\overline{b}}^{255}$ respectively. If a position for levels 0 and 255 coincides, which is rare, one can take the average or another combination, depending on the specifics of the correction (such as correction more important at 0, or minimizing brightness loss at 255, etc.). The full set of voltages adjustments are:

Modified Voltages: $\{V_{a\overline{b}}\}$ (63)

At $(x_a^0, y_b^0)$: $V_{ab} = V_{ab}^0$

At $(x_a^{255}, y_b^{255})$: $V_{a\overline{b}} = V_{a\overline{b}}^{255}$

If $(x_a^0, y_b^0) = (x_a^{255}, y_b^{255})$ for some $(\overline{a}, \overline{b})$ use one of:

$$V_{ab} = \begin{cases} \text{Original } V \\ V_{a\overline{b}}^0 \\ V_{a\overline{b}}^{255} \\ \frac{V_{a\overline{b}}^0 + V_{a\overline{b}}^{255}}{2} \end{cases}$$

For most corrections, the two sets of positions do not coincide. The positions of the $V_{a\overline{b}}$, having taken into account levels 0 and 255, can be now written as $(x_{\overline{a}}, y_{\overline{b}})$, with the 0 and 255 subscripts dropped.

The values (63) provide the voltage settings required at specific pixels positions. In general these do not correspond to the LED positions. The pixel resolution number is much larger than the LED resolution, i.e. number of LEDs. A single LED, combined with the diffusing effects, lights up many pixels. The LED voltages are $V_i$, $i=1 \ldots L$ (see (6))—let the positions of these LEDs be $(x_{Li}, y_{Li})$, $i=1 \ldots L$. An LED is assigned a value by essentially "averaging" of all $V_{a\overline{b}}$ that are closest in position to the LED. Depending on the type of averaging, various "smoothing" of the voltage correction can be achieved. A few approaches are discussed.

A simple averaging method is to take for every adjusted voltage position $(x_{\overline{a}}, y_{\overline{b}})$, the closest LED and assign it $V_{a\overline{b}}$. An LED may get more than one assignment, denoted $N_{Vi}$, from different positions. The voltages assigned to LED $i$ from positions $(x_j^i, y_j^i) \in \{(x_{\overline{a}}, y_{\overline{b}})\}$, $j=1 \ldots N_{Vi}$ are labeled as $\tilde{V}_{ij} \in \{V_{\overline{ab}}\}$. The final voltage used is then the average of these, giving the correction:

$$V_i \to V_i', \quad (64)$$

$$i = 1 \ldots L$$

$$V_i' = \frac{1}{N_{Vi}} \sum_{j=1}^{N_{Vi}} \tilde{V}_{ij}$$

$$\tilde{V}_{ij} \in \{V_{\overline{ab}}\}$$

LEDs not affected by the above will retain their original value of V. If the sampling of pixel positions $(x_a, y_b)$ is of the order of the resolution of the LEDs and positioned similar to the LED positions, then the number of assignments from each $(x_a, y_b)$ will essentially be one. In this case the above average becomes essentially selecting the nearest $V_{\overline{ab}}$ for each LED, i.e. there is no sum. In fact, during computation of the backlight correction, the sampled pixel positions can be kept small corresponding with some subset of the LED positions. This also speeds the computation. A variation on (64) is to assign weights $\alpha_{ij}$ depending on the distance from the LED:

$$V_i' = \frac{1}{N_{Vi}} \sum_{j=1}^{N_{Vi}} \alpha_{ij} \tilde{V}_{ij} \quad (65)$$

$\alpha_{ij}$ weight depends on $\|(x_j^i, y_j^i) - (x_{\overline{a}}, y_{\overline{b}})\|$ For each $V_{\overline{ab}}$, instead of picking the closest LED, the closest n LEDs, with an appropriate weighting, can be taken—this is essentially a variation of (65).

The voltages can also be computed from point of view of the LEDs. For each LED, take an appropriate weighted sum of $V_{\overline{ab}}$, within a certain distance:

$$V_i' = \sum_{d \leq D} \alpha(d) \times V_{\overline{ab}} \quad (66)$$

$\alpha(d)$ weight depends on $d = \|(x_{Li}, y_{Li}) - (x_a, y_b)\|$

These methods are all different types of averaging.

A slightly different method is to interpolate or fit a smooth function to the $V_{\overline{ab}}$ values over $(x, y)$. This gives a 2D voltage surface which can be evaluated at $(x_{Li}, y_{Li})$ to determine the voltage at the ith LED. If the function is denoted $F_{0V}(x, y)$ one has:

$$V = F_{0V}(x,y): \text{Fit/Interpolant to } (x_a, y_{\overline{b}}, V_{a\overline{b}})$$

$$V_i' = F_{0V}(x_{Li}, y_{Li}) \quad (67)$$

A fit is preferred over interpolation as it will include a smoothing.

The corrected voltage values $\{V_i'\}$ have been computed for a particular starting backlight setting V. Each backlight setting will have a different set of correction voltages computed using the above steps. Normally the computations are done at a set of voltage values as in (21), and the corrections interpolated between the levels. It is also possible to use the same relative adjustment for all backlight settings. The set of corrected voltages for backlight settings $V_{si}$, $i=1 \ldots N_V$, will be denoted using the earlier vector notation:

$$\text{Before Correction: } \{\vec{V}_i\} \rightarrow \text{After Correction: } \{\vec{V}_i'\} \quad (68)$$

$$\vec{V}_i = \begin{bmatrix} V_{s1} \\ V_{si} \\ \vdots \\ V_{si} \end{bmatrix},$$

$$\vec{V}_i' = \begin{bmatrix} V_{i1}' \\ V_{i2}' \\ \vdots \\ V_{iL}' \end{bmatrix},$$

$$i = 1 \ldots N_V$$

Here $V_{ij}'$ denotes the corrected voltage from one of (64) to (67) approaches, for the jth LED at $(x_{i,j}, y_{i,j})$, for a backlight setting $V=V_{si}$. Thus the correction amounts to a change of $V_{ij}'-V_{si}$ at the jth LED for initial voltage $V=V_{si}$. If there are RGB LEDs, all three are applied the same correction, ensuring that the backlight correction adjusts brightness only and does not introduce color artifacts.

The backlight correction can also change with the input pixel level in theory. However, the out of range condition (60) is primarily determined by the maximum and minimum grey levels. Due to monotonic responses, intermediate color levels will be in range provided the maximum and minimum levels have been brought to range. Other levels do not need to be independently considered for testing the out of range condition. As such, the voltage correction is kept independent of the color level, though levels 0 and 255 are used to determine the correction itself. This also means that for uniformity correction, at a fixed backlight setting the voltages are adjusted once and not changed (unless the global backlight setting changes) when the input pixel value changes. The content dependent change required is then managed by the pixel correction (58) alone. Another benefit of having the backlight correction independent of the color level being that the uniformity correction will not interfere with other LCD display features, such as local dimming and high dynamic range imaging. These features are all content (color level) dependent and will compete with the uniformity correction if it was also color dependent.

The backlight discussion in the exemplary embodiment has focused on the case where LEDs can individually be adjusted, namely a direct backlit configuration. However as mentioned before, the approach can also be used where there are CCFL tubes or edge-lit LEDs that can be individually controlled. The main change being that adjusting an LED or tube will influence a much larger number of pixels and that needs to be taken into account in the averaging. If local adjustment is complicated, as it may be in an edge-lit backlight or tube based backlight, a global corrected value V' can be used. Possible choices being:

$$V' = \begin{cases} \text{Average } V_{ab} \\ \text{Maximum } V_{ab} \\ \text{Minimum } V_{ab} \end{cases} \quad (69)$$

The choice again dictated by the specifics of the correction.

It can be appreciated that a lot of variations are possible and depending on the requirements for the correction and also factors outlined above (computation speed, number of levels being corrected, etc.), different combinations will provide the best result for different criteria. In particular, the backlight correction can be entirely skipped if a very quick luminance correction towards a minimum uniform quantity is required.

The backlight correction (68) provides a coarse correction for brightness uniformity due to the limited resolution of the LEDs (CCFLs are even more limited). A backlight correction alone is insufficient to obtain high level of uniformity; in particular it cannot provide color uniformity correction. Coarse also implies that a change in the LEDs is more pronounced than changes in pixel values. This means that once the LEDs are adjusted according to (68), the pixel correction needs to be recomputed using (35). To make the process fast and efficient, the first pixel correction, prior to the backlight correction computation, can be made as a rough estimate measuring only levels 0 and 255, for a small number of points, and using the approximation (34). Once the backlight correction has been computed and the LEDs adjusted, then a more detailed calculated with more levels can be made using (35). If required, the steps of approximate pixel correction plus backlight correction can be iterated to ensure that W's are all within range, before proceeding to the detailed computation.

An important benefit of the present method is that it unifies the key components requiring correction, namely the backlight source and the pixels, within the same framework. Both components affect uniformity in an inter-dependent manner and must be treated in parallel for best results.

The method presented herein for generating the backlight correction does not rely on knowing the PSF of the LEDs and/or diffuser. It uses one or more simple iterations to determine a backlight correction, and then determine the precise matching pixel correction. This is very beneficial in practice since PSFs and diffuser effects are very difficult to determine precisely. The present approach is also very practical for a manufacturing flow, whereby the details of the various optical/electronic components (LEDs, diffusers, coatings), often provided by different vendors, need not be known. This correction can also be applied in the field provided some backlight control is available—most displays do allow a global backlight setting control.

In one embodiment, the less common case when PSFs are available, a mathematical approach can be used. This is formulated herein, though the more "empirical" method presented above is more valuable in practice. According to eq. (25) the response splits into a backlight component and a pixel component:

$$F_i(x,y,\vec{C},\vec{V})=F_i^P(x,y,\vec{V}) \times F_i^P(x,y,\vec{C}) \quad (70)$$

For the backlight correction, only the luminance response is considered. The voltage dependence only appears in the backlight response $F_i^P(x,y,\vec{V})$. The response component $F_i^P(x,y,\vec{C})$ is independent of the voltage—this is not identical to the full response $F_i(x,y,\vec{C})$, which was based on the measured data for a fixed backlight setting. Specifically $F_i(x,y,\vec{C})$ changes with voltage, whereas $F_i^P(x,y,\vec{C})$ is constant. The component $F_i^P(x,y,\vec{C})$ will be referred to as the base pixel response. The base pixel response can also be represented as in (35), giving:

$$F_Y^P(x,y,\vec{C})=\Sigma_{m=1}^3 \Sigma_{n=0}^d a_{mn}^Y(x,y)(C_m)^n$$

$$\vec{C}=(C_1,C_2,C_3) \equiv (R,G,B) \quad (71)$$

The yet to be determined coefficients $\bar{a}_{mn}^{Y}(x,y)$ define the response. The spatial dependence has been made explicit by writing the coefficients as functions of (x, y).

Turning now to $F_Y^L(x,y,\vec{V})$, let $P_i(x,y)$ be the normalized PSF of the ith LED, including the affects of the diffuser and any other components. That is $P_i(x,y)$ is the PSF incident at the pixel plane, having gone through the diffuser, etc., when only the ith LED is on. It is now assumed that $P_i(x,y)$ is known. The contribution of the ith LED with voltage $V_i$ to the backlight response is:

$$F_{Y,i}^L(x,y,V_i)=V_i P_i(x,y) \tag{72}$$

This assumes that the dependence on the voltage is linear, as is expected for LCD displays and shown in FIG. 19. The backlight response is a sum over all LEDs:

$$F_Y^L(x,y,\vec{V})=\Sigma_{i=1}^{N_L} V_i P_i(x,y) \tag{73}$$

The full response then becomes:

$$F_Y(x,y,\vec{C},\vec{V})=\Sigma_{i=1}^{N_L} V_i P_i(x,y) \times \Sigma_{m=1}^{3} \Sigma_{n=0}^{d} \bar{a}_{mn}^{Y}(x,y)(C_m)^n \tag{74}$$

This represents the complete luminance response for any RGB input, at any pixel position (x,y), and any LED voltage values. As mentioned above, this is rarely a known quantity a priori.

The full response at a fixed voltage value was determined from the measured data above as $F_Y^{\vec{V}}(x,y,\vec{C})$ in terms of the component responses (35). The superscript $\vec{V}$ has been included to indicate that this was computed at a specific voltage. This measured response must equal (74) giving the following constraint equation:

$$F_Y(x,y,\vec{C},\vec{V})=F_Y^V(x,y,\vec{C})$$

$$\Sigma_i{}_1^{N_L} V_i P_i(x,y) \times \Sigma_m{}_1^{3} \Sigma_n{}_0^{d} \bar{a}_{mn}^{Y\vec{V}}(x,y)(C_m)^n = \Sigma_m{}_1^{3} \Sigma_n{}_0^{d} a_{mn}^{YV}(x,y)(C_m)^n \tag{75}$$

The coefficients $a_{mn}^{Y}$ have been re-written as $a_{mn}^{Y\vec{V}}(x,y)$, to show that they depend on the position (x, y) and the voltages applied $\vec{V}$. At each position, a separate equation (75) exists and needs to be solved independently. All quantities in (75) are known except the $\bar{a}_{mn}^{Y}(x,y)$ coefficients. The equality needs to hold for all $\vec{C}$, which is only possible if the coefficients for each $(C_m)^n$ term are identical. This gives the solution for $\bar{a}_{mn}^{Y}(x,y)$ as:

$$\bar{a}_{mn}^{Y}(x,y) = \frac{a_{mn}^{YV}(x,y)}{\sum_{i=1}^{N_L} V_i P_i(x,y)} \tag{76}$$

With the $\bar{a}_{mn}^{Y}(x, y)$ determined, the full response (74) is a known function and can be used to solve for the backlight correction.

In principle (74) provides solutions for both the pixel and backlight corrections. The correction (including X and Z tristimulus responses) is the solution to:

$$\bar{X}=\Sigma_i{}_1^{N_L} V_i P_i(x,y) \times \Sigma_m{}_1^{3} \Sigma_n{}_0^{d} \bar{a}_{mn}^{X}(x,y)(C_m)^n$$

$$\bar{Y}=\Sigma_i{}_1^{N_L} V_i P_i(x,y) \times \Sigma_m{}_1^{3} \Sigma_n{}_0^{d} \bar{a}_{mn}^{Y}(x,y)(C_m)^n$$

$$\bar{Z}=\Sigma_i{}_1^{N_L} V_i P_i(x,y) \times \Sigma_m{}_1^{3} \Sigma_n{}_0^{d} \bar{a}_{mn}^{Z}(x,y)(C_m)^n \tag{77}$$

With the restriction that:

$$0 \leq C_m \leq 2^{b_a}-1, m=1\ldots 3$$

$$V_i \in [V_0-\delta, V_0+\delta], i=1\ldots N_L \tag{78}$$

The first restriction states that the pixel values have to be in range [0,255], and the second restriction states that that the solution for the voltage values also should be in some valid range. Equation (77) is a non-linear system of equations and exists as an independent equation at every position $(x_a, y_b)$. Thus we have a non-linear system of $3 \times N_x \times N_y$ equations in $3 \times N_x \times N_y + N_L$ variables; the $3 \times N_x \times N_y$ come from the different $C_m$ values at each position. This is a complicated system to solve, especially under time constraints. Instead, the efficient two-step approach presented above can be also be used here. First the solution (56) (or taking (57) for approximation) is computed for grey levels 0 and 255, concentrating on luminance. These are denoted as $C_m^0$, and $C_m^{255}$. Those positions at which $C_m^0$ and $C_m^{255}$ fall out of the valid range, have $C_m^0$ and $C_m^{255}$ values clipped:

$$C_m^0 < 0 \Rightarrow C_m^0 = 0$$

$$C_m^{255} >= 255 \Rightarrow C_m^{255} = 255 \tag{79}$$

If the values are in range then no clipping is required. Denote the values with clipping taken into account as $\overline{C}_m^0$ and $\overline{C}_m^{255}$. These adjusted values are then used to solve for the corrected LED voltages $V_i'$ values by solving:

$$\bar{Y}^0=\Sigma_{i=1}^{N_L} V_i' P_i(x,y) \times \Sigma_{m=1}^{3} \Sigma_{n=0}^{d} \bar{a}_{mn}^{Y}(x,y)(\overline{C}_m^0)^n$$

$$\bar{Y}^{255}=\Sigma_{i=1}^{N_L} V_i' P_i(x,y) \times \Sigma_{m=1}^{3} \Sigma_{n=0}^{d} \bar{a}_{mn}^{Y}(x,y)(\overline{C}_m^{255})^n \tag{80}$$

As previously, an independent set of $V_i'$ values are computed for each initial backlight setting V; recall this is the common voltage applied to all LEDs in computing $C_m^0$ and $C_m^{255}$. Using the same notation as in (68), write the corrected voltage values for initial setting $V_{sj}$ (here j is the setting index and i the LED index) as:

$$V_{ji}' = V_{sj} + \Delta_{ji}^{V} \tag{81}$$

Then the corrected backlight voltages are computed from:

$$\Sigma_{i=1}^{N_L} \Delta_{ji}^{V} P_i(x_a,y_b) = \bar{Y}^0 (\Sigma_{m=1}^{3} \Sigma_{n=0}^{d} \bar{a}_{mn}^{Y}(x_a,y_b)(\overline{C}_m^0)^n)^{-1} - V_{sj} \Sigma_{i=1}^{N_L} P_i(x_a,y_b)$$

$$\Sigma_{i=1}^{N_L} \Delta_{ji}^{V} P_i(x_a,y_b) = \bar{Y}^{255} (\Sigma_{m=1}^{3} \Sigma_{n=0}^{d} \bar{a}_{mn}^{Y}(x_a,y_b)(\overline{C}_m^{255})^n)^{-1} - V_{sj} \Sigma_{i=1}^{N_L} P_i(x_a,y_b)$$

$$a=1\ldots N_x, b=1\ldots N_y \tag{82}$$

Unlike (77), this is now a linear system of equations, which are much easier to solve. A pair of such equations exists for every position $(x_a, y_b)$, hence (x,y) has been replaced by $(x_a, y_b)$, giving a linear system of $2 \times N_x \times N_y$ equations in $N_L$ variables $\Delta_{ji}^{V}$ (note each jth setting is treated separately). The unified approach mentioned previously, treating backlight correction and pixel correction in parallel, is very clear in equation (82). Only one of the two equations in (82) may be used—for example if correction at 255 is more critical then the only the second equation may be used.

For LCDs various other optimizations can be made that make solving (82) simpler. The number of points, and hence the number of equations, can be reduced such that there are more variables $\Delta_{ji}^{V}$ than the number of equations. This ensures that in general solutions will exist. Such a reduction is always possible since the coarse brightness improvement sought by the LED correction varies over large regions. If the number of variables and equations are the same then one has a square matrix system. The positions can be taken to correspond with the LEDs, which simplify the matrix, by reducing the relative contributions of the neighboring LEDs. The number of LEDs contributing at a specific position can be limited to the nearest LEDs. This will bring (82) into a "block-diagonal" type form (taking as an example contributions from only 3 LEDs):

$$\begin{pmatrix} a_{11} & a_{12} & a_{13} & 0 & 0 & 0 & \dots \\ a_{21} & a_{22} & a_{23} & 0 & 0 & 0 & \dots \\ a_{31} & a_{32} & a_{33} & 0 & 0 & 0 & \dots \\ 0 & 0 & a_{43} & a_{44} & a_{45} & 0 & \dots \\ 0 & 0 & a_{53} & a_{54} & a_{55} & 0 & \dots \\ 0 & 0 & a_{63} & a_{64} & a_{65} & 0 & \dots \\ \vdots & \vdots & \vdots & \vdots & \vdots & \vdots & \ddots \end{pmatrix} \begin{pmatrix} \Delta_{j1} \\ \Delta_{j2} \\ \Delta_{j3} \\ \Delta_{j4} \\ \Delta_{j5} \\ \Delta_{j6} \\ \vdots \end{pmatrix} = \begin{pmatrix} b_1 \\ b_2 \\ b_3 \\ b_5 \\ b_5 \\ b_6 \\ \vdots \end{pmatrix} \quad (83)$$

Well known numerical methods can be used to solve such systems. The coarser the correction required, the more simplifications that can be made. Only the nearest LED may be used to greatly reduce (82).

As shown above when the PSFs are known, computing the backlight correction can be reduced to solving systems as in (82). In practice, PSFs are complicated to compute and often unavailable, in which case the iterative approach provides a fast and practical alternative to determining the backlight correction.

At the end of the re-calibration stage 45 the pixel correction and backlight correction are known. The pixel correction $\vec{C}'$ is provided as a set of corrected pixel values, for each level $\vec{C}'$ and common backlight setting $V_{sj}$, across a grid of points $(x_a, y_b)$. The backlight correction $\vec{V}'$ is provided as a set of corrected LED voltages depending on the common backlight setting $V_{sj}$. This data is summarized below:

Pixel Correction $$\vec{C} = (R, G, B) \Rightarrow \vec{C}' = (R_{\vec{C}abj}', G_{\vec{C}abj}', B_{\vec{C}abj}')$$

Backlight Correction $$\vec{V} = \begin{bmatrix} V_{sj} \\ V_{sj} \\ \vdots \\ V_{sj} \end{bmatrix} \Rightarrow \vec{V}' = \begin{bmatrix} V'_{j1} \\ V'_{j2} \\ \vdots \\ V'_{jL} \end{bmatrix}, \quad (84)$$

$$j = 1 \dots N_V$$

The index j indicates the common backlight setting one starts with.

The next stage of reconstruction takes this grid data to a functional form 48. For the pixel correction this will provide new pixel values for all levels, all pixel positions and backlight settings. For the backlight correction this will provide new LED voltage values at any given common backlight setting. Constructing a functional form essentially means converting the above data at discrete points of the various spaces into a continuous function, using some fitting or interpolation method. This is completely analogous to constructing the responses in (35) from a set of points. The form of the function depends also on the hardware in the next and last application stage. A general form, that has a very efficient hardware implementation, has been presented in U.S. Pat. No. 7,324,706. The same form is used here and summarized.

The ranges for all independent variables are broken into regions and a separate function is fitted or interpolated to the data (84) on each region. Similar to the response computation, fitting is preferred and a polynomial basis is used. The pixel correction is considered first. Starting with pixels positions, the position space (x, y) is divided into 2D patches and a polynomial fitted to the $(R_{\vec{C}abj}', G_{\vec{C}abj}', B_{\vec{C}abj}')$ grid points at $(x_a, y_b)$ on each patch. Continuity of the function is ensured across patches. The patch numbers and fitting can be adjusted so that polynomial represents the grid point very accurately. If the number of grid points on each patch equals the number of polynomial coefficients, then the fit becomes an interpolating function. Many software routines are available for fitting and interpolating (e.g. MATLAB Spline Toolbox). The result of the fitting in (x, y) is the following functional forms:

$$R_{\vec{C}j}'(x,y) = \Sigma_m{}^{d_x}\Sigma_n{}^{d_y} a_{\vec{C}jmn}{}^R x^m y^n$$

$$G_{\vec{C}j}'(x,y) = \Sigma_m{}^{d_x}\Sigma_n{}^{d_y} a_{\vec{C}jmn}{}^G x^m y^n$$

$$B_{\vec{C}j}'(x,y) = \Sigma_m{}^{d_x}\Sigma_n{}^{d_y} a_{\vec{C}jmn}{}^B x^m y^n \quad (85)$$

Here $d_x$ and $d_y$ are the polynomial degrees in x and y. Note the fitting of (x, y) has eliminated the ab indices and turned the discrete dependence into a continuous dependence. The discrete dependence on the level and backlight setting remains. Next fitting is done in the pixel value space (RGB), using the correction grids (58) computed for the different levels that were made uniform. The RGB space is also divided into patches, and polynomials fitted on each patch. Here the patches are actually 3D cubes since the RGB space is 3 dimensional. The result of the fitting is the functional forms:

$$R_j'(x,y,R) = \Sigma_r{}^{d}\Sigma_s{}^{d}\Sigma_t{}^{d}\Sigma_m{}^{d_x}\Sigma_n{}^{d_y} a_{jmnrst}{}^R x^m y^n R^r G^s B^t \quad (86)$$

A common degree d has been used for the RGB fitting. Similar form for G and B can be found. For the most common case of uniformity correction by considering only grey level, (86) can be simplified to:

$$R_j'(x,y,R) = \Sigma_{r=0}{}^{d}\Sigma_{m=0}{}^{d_x}\Sigma_{n=0}{}^{d_y} a_{jmnt}{}^R x^m y^n R^t \quad (87)$$

We use (88) to simplify the notation. The only discrete dependence remaining is on the backlight setting. This is again eliminated by splitting the backlight control into 1D patches and fitting on each of these patches. This gives:

$$R'(x,y,R,V) = \Sigma_{k=0}{}^{d_V}\Sigma_{t=0}{}^{d}\Sigma_{m=0}{}^{d_x}\Sigma_{n=0}{}^{d_y} a_{mntk}{}^R x^m y^n R^t V^k$$

$$G'(x,y,G,V) = \Sigma_{k=0}{}^{d_V}\Sigma_{t=0}{}^{d}\Sigma_{m=0}{}^{d_x}\Sigma_{n=0}{}^{d_y} a_{mntk}{}^G x^m y^n G^t V^k$$

$$B'(x,y,B,V) = \Sigma_{k=0}{}^{d_V}\Sigma_{t=0}{}^{d}\Sigma_{m=0}{}^{d_x}\Sigma_{n=0}{}^{d_y} a_{mntk}{}^B x^m y^n B^t V^k \quad (89)$$

V is again used in (90) for the backlight control which may be in some normalized units. Equation (88) is written in a very general form, though by using linear polynomials (d=1) or other optimizations, can be made much simpler in practice. Also if the same correction is used for all backlight setting then the V dependence in (88) is removed.

The backlight correction function is generated in the same fashion. The voltage data is fitted as a function of the backlight control using the data computed in (68), i being the LED index:

$$V_i'(V) = \Sigma_j{}^{d_L} a_j{}^i V^j, \quad i = 1 \dots N_L \quad (91)$$

The function should be taken to satisfy:

$$V_i'(V_{sj}) = V_{ji}', \quad j = 1 \dots N_V, \quad i = 1 \dots N_L \quad (92)$$

The backlight correction should be viewed as giving the correct LED voltages in response to the backlight setting or control, which may be a starting common voltage or some normalized quantity related to common voltage. Equations (88) and (89) give the final pixel correction map and the backlight correction map for the uniformity correction process. These are rewritten below as:

$$\vec{C}' = \vec{F}_C(x, y, \vec{C}, \vec{V}) = \sum_{k=0}^{d_V} \sum_{t=0}^{d} \sum_{m=0}^{d_x} \sum_{n=0}^{d_y} \vec{a}_{mntk} x^m y^n \vec{C}' V^k \quad (93)$$

$$V'_i = F_{Vi}(V) = \sum_{j=0}^{d_L} a_j^i V^j$$

$$\vec{a}_{mntk} = \begin{pmatrix} a_{mntk}^R \\ a_{mntk}^G \\ a_{mntk}^B \end{pmatrix},$$

$$i = 1 \ldots N_L$$

The first expression in (91) should be understood as being evaluated component-wise (i.e. separately for R, G, and B) on the right. This provides a very compact form for the correction in terms of a set of coefficients $\{\vec{a}_{mntk}, a_j^i\}$, which can conveniently be stored and the polynomials evaluated in hardware.

Figure 22:
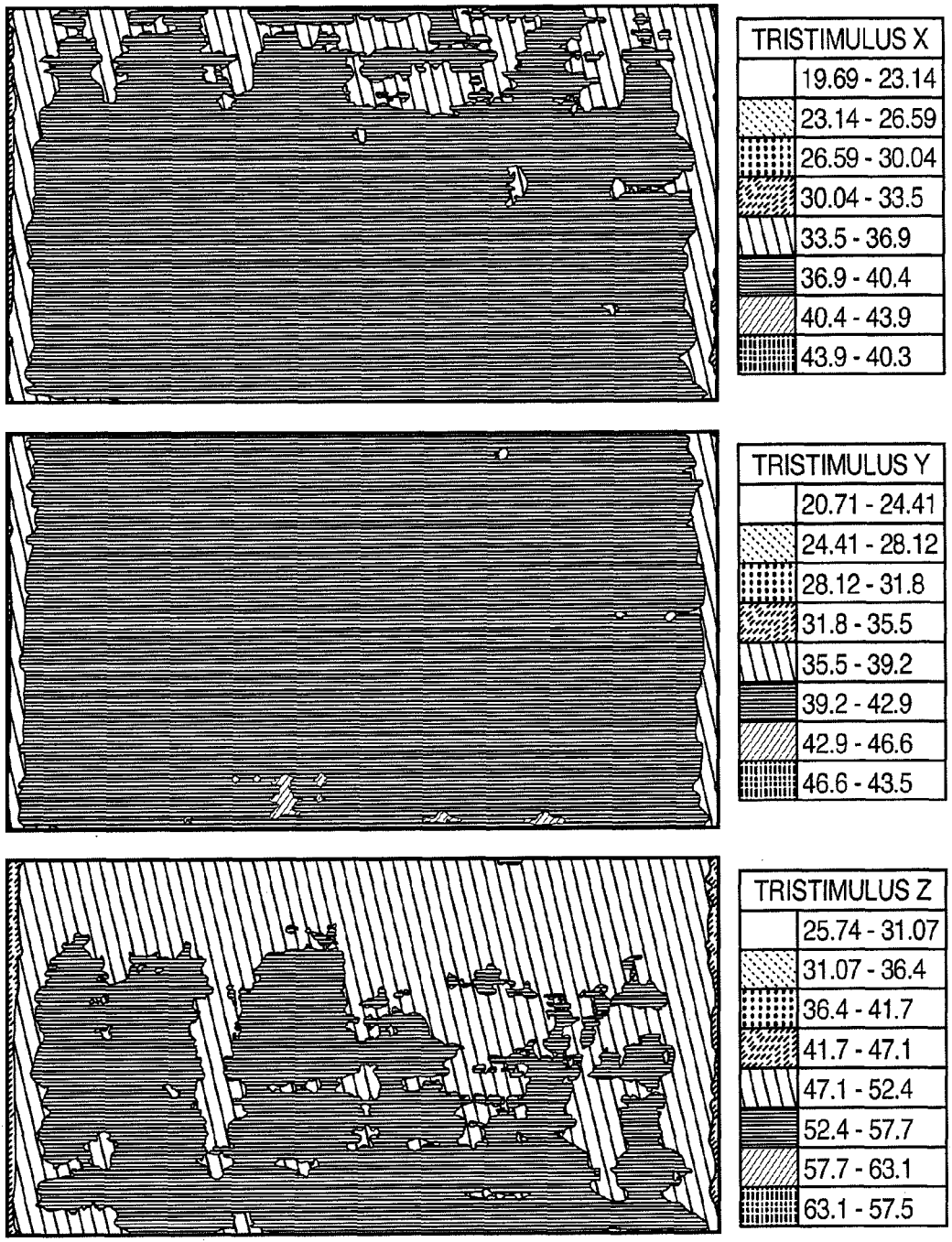
FIG. 22 is a 2D contour plot of the three stimulus values as measured for the grey level 192, after correction.

The final stage 49 involves applying the correction maps (91) to the LCD display using an appropriate hardware platform. The maps can easily be applied by using an FPGA due to the highly compact representation. The FPGA design essentially consists of multipliers and adders that evaluate the above functions for the input RGB signal and backlight control. Co-pending patent application Ser. No. 11/649,765 describes a hardware architecture 100, implementable in an FPGA or ASIC, for applying the pixel correction at a fixed backlight setting. This architecture can also be used for evaluation of the backlight map, as well as further extended for additional functional dependence in the pixel maps on the backlight control. For the display used in the embodied experiment (FIGS. 6 to 8), an FPGA based on the system 100 was used to apply the correction. The tristimulus values XYZ and chromaticity plots for the same level (192,192,192), after the uniformity correction using the method described herein, are shown in FIGS. 21 to 22. Comparing these with the correspond plots in FIGS. 6 and 8, the large improvement in uniformity is clearly seen. The statistics after correction are shown in table 2.

TABLE 2

| | Uniformity Statistics Before Correction | | | | |
|---|---|---|---|---|---|
| Physical Quantity | % Uniformity | % Non-Uniformity | Average | % Increase in Uniformity | % Decrease in Non-uniformity |
| Tristimulus X | 90.88 | 9.12 | 37.77 cd/m² | 57.87 | 78.50 |
| Tristimulus Y (Luminance) | 91.31 | 8.69 | 41.00 cd/m² | 55.48 | 78.95 |
| Tristimulus Z | 87.35 | 12.65 | 52.49 cd/m² | 67.75 | 73.61 |
| **Chromaticity $x_c$ | 98.45 | 1.55 | 0.2878 | 4.90 | 74.78 |
| **Chromaticity $y_c$ | 96.48 | 3.52 | 0.3124 | 5.99 | 60.80 |

Figure 24:
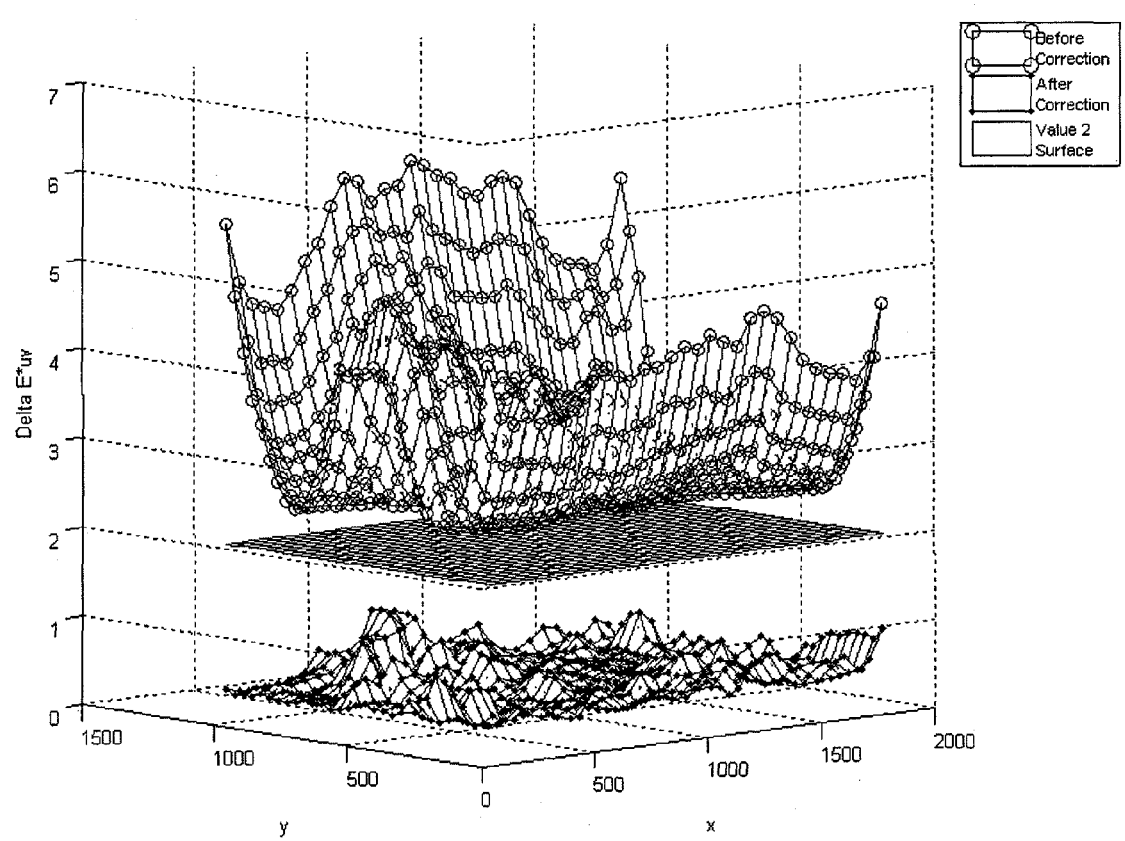
FIG. 24 is a 3D plot of the Delta E*uv value before and after correction, computed across the pixel positions, giving a measure of perceptible color differences. The constant value "2" surface is also shown, with values above being perceptible and below not perceptible. The legend is shown at the top right for the 3 surfaces.

The last two columns give the percentage changes in uniformity/non-uniformity. The uniformity has drastically improved after the correction, with the luminance going from 58.73% uniformity to 91.31% uniformity. This corresponds to a uniformity increase of 58%, i.e. >1.5×. Equivalently the non-uniformity is seen to decrease by 79%. Similar improvements can be seen in X and Z tristimulus quantities; specifically, the Z uniformity increased by a factor of 1.67, which is key for color uniformity. The chromaticity coordinates also show large decreases in non-uniformity; more importantly, the delta in $(x_c, y_c)$ approximated as (% non-uniformity X average) is now <0.01, leading to perceptual color uniformity across the display. To further verify this, the distance $\Delta E_{uv}^*$ is computed in the perceptual CIE L*u*v* space, which is a measure of the perceptibility of color differences. A distance of $\leq 1$ is considered to be imperceptible (the two colors will look the same) whereas values near $\geq 2$ are considered perceptible, though it should be noted this is an approximation. Color differences outside of this range may or may not be perceptible in practice. To obtain an estimate for $\Delta E_{uv}^*$, the following "perceptibility surface" is generated. For every pixel (say at $(x_0, y_0)$), $\Delta E_{uv}^*$ is computed between its L*u*v* values and those of all other pixels. These $\Delta E_{uv}^*$ values, W×H (display resolution) in total, are all averaged and assigned to the pixel $(x_0, y_0)$. The process is repeated for all pixels, and amounts to computing distances for all possible pixel pair combinations. This provides a $\Delta E_{uv}^*$ surface in (x, y) space indicating the average perceptual color distance between a pixel and all other pixels. The $\Delta E_{uv}^*$ surfaces before and after correction are shown in FIG. 24. A plane at value of 2 is also shown for reference. Before the correction, numerous pixels have their values near 4, whereas after correction all pixels are $\leq 1$. FIG. 24 clearly shows the improvement in color uniformity with the correction. Having used the average metric in (39) for the correction, one expects the averages not to change. This is verified by comparing the third columns in Tables 1 and 2, which further provides support for the linear approximation in (50).

Figure 25:
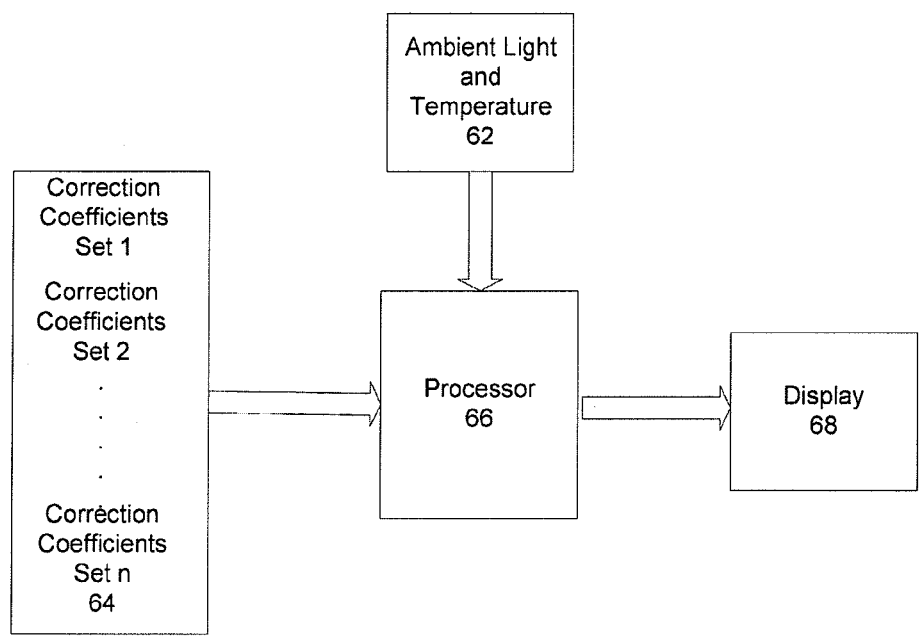
FIG. 25 illustrates selection of the stored correction coefficients proper for the ambient light and temperature.

The compact nature of the correction of Eq. (91), namely requiring only storage of the coefficients $\{\vec{a}_{mntk}, a_j^i\}$, implies that any external variables that may affect uniformity can be corrected by storing a specific set of coefficients associated with those variables. As an example, illustrated in FIG. 25, corrections can be computed for different ambient light levels or different temperatures 62. As the ambient light changes, the appropriate coefficient set 64 can be loaded to the processor 66 and applied to the display 68. The computation of the ambient light coefficient sets is made exactly as prescribed above, with the difference being in only the measured values. Another common external variable is ambient temperature of the light source components; in particular the LED response is known to vary with temperature. Different corrections can be computed and applied for different temperature levels. Computations of the correction are as above, but now made at a specific monitored temperature.

The present invention has provided an accurate and efficient approach to greatly improving both brightness and color uniformity in backlit LCD displays. Since the correction is done at the output of the display, namely what the viewer sees, it corrects for all sources of non-uniformity. By working with tristimulus values it accurately takes into account uniformity as perceived by the observer. The embodied methods provide correction maps for both the pixels and the light source, in a unified framework. Various embodiments provide various optimizations which can be used to streamline the process based on specific criteria, such as computation speed, type of correction, etc.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method for improving color and brightness uniformity of a Liquid Crystal Display (LCD) backlit by a plurality of light source components, said method comprising:
    setting at least one backlight voltage common to all the light source components;
    for each of the at least one backlight voltage settings, displaying a plurality of reference input images having pre-determined flat RGB pixel values across the display for at least one signal level;
    measuring the display uniformity at a selected set of grid points on the display in response to said plurality of reference input images, the uniformity being characterized by at least one of the tristimulus values, luminance and chrominance components;
    generating a display response function from the measured uniformity data, the response function being the sum of responses for R, G and B components for every pixel of the display;
    computing a pixel correction grid data map that results in a constant uniformity value for all pixels at each said at least one signal level;
    converting the pixel correction grid data map into a functional form represented by a set of coefficients; and
    applying the pixel correction functions to the input signal and the display for all pixel positions and color values.

2. The method of claim 1, wherein the response function further depends on the backlight voltage setting and the correction grid data includes a backlight correction map applying to the backlight source components.

3. The method of claim 2, wherein the pixel map is regenerated after application of the backlight correction, and the backlight and pixel corrections are iterated until required degree of uniformity is achieved.

4. The method of claim 2, wherein the backlight response function is represented as a linear function.

5. The method of claim 2, wherein the backlight correction is obtained using tristimulus Point Spread Functions (PSF) of each light source component.

6. The method of claim 5, wherein the PSF is provided as a specification of the light source components.

7. The method of claim 5, wherein the PSF is approximated using mathematical models.

8. The method of claim 5, wherein the PSF is directly measured.

9. The method of claim 1, wherein the reference input images are a plurality of pure grey levels for brightness only corrections.

10. The method of claim 1, wherein each said light source component is a Light Emitting Diode (LED).

11. The method of claim 1, wherein each said light source component is a Cold Cathode Fluorescent Lamp (CCFL) tube.

12. The method of claim 1, wherein each said light source component is a Laser Diode (LD).

13. The method of claim 1, wherein the reference input images are a plurality of levels of pure red, pure green, and pure blue levels.

14. The method of claim 13, wherein the reference input images further include a plurality of pure grey levels, implemented to compensate for LCD black level offset of RGB components.

15. The method of claim 1, wherein the display response function is obtained using a polynomial fit to the measured grid points.

16. The method of claim 15, wherein the polynomial is a cubic function.

17. The method of claim 1, wherein the display response function is obtained by interpolating the measured grid point data.

18. The method of claim 1, wherein the display response function is estimated by modeling the function as a power law.

19. The method of claim 1, wherein the response function is a plurality of local polynomial fits to a vicinity of the measured grid points, such that the local fits are monotonic functions.

20. The method of claim 15, wherein the response function is shifted and scaled to make the function monotonic.

21. The method of claim 1, wherein the constant uniformity value of the response function is set as the average measured value.

22. The method of claim 1, wherein the constant uniformity value of the response function is set as the minimum measured value in case the corrected pixel values go above the allowable bit range for high signal levels.

23. The method of claim 1, wherein the constant uniformity value of the response function is set to be the maximum measured value in case the corrected pixel values go below the allowable bit range for low signal levels.

24. The method of claim 1, wherein a plurality of said set of coefficients for several pixel correction maps is computed and stored corresponding to several settings of ambient temperature.

25. The method of claim 1, wherein a plurality of said set of coefficients for several pixel correction maps is computed and stored corresponding to several settings of ambient light.

26. An electronic system for improving color and brightness uniformity of a backlit LCD, said system comprising:
    a display panel consisting of arrays of pixels, each said pixel being characterized by a controllable digital RGB value;
    a backlight source panel consisting of a plurality of light source components, each said light source component characterized by an adjustable voltage control;
    an image generator unit for displaying a plurality of reference input images having pre-determined flat RGB pixel values across the display, for at least one signal level, for each of the plurality of light source components on the display;
    an image capture and measurement unit to measure the display uniformity at a selected set of grid points on the display in response to said plurality of reference input images, the uniformity being characterized by at least one of the tristimulus values, luminance and chrominance components;

a first processing means to generate a display response function from the measured uniformity data, and compute a pixel correction grid data map that results in a constant uniformity value for all pixels at each said at least one signal level; and a second processing means to convert the pixel correction grid data map into a functional form represented by a set of coefficients, and applying the pixel correction functions to the input signal and the display for all pixel positions and color values.

27. The system of claim 26, wherein the response function further depends on the backlight voltage setting and the correction grid data includes a backlight correction applying to the backlight voltage controls.

28. The system of claim 26, wherein each said light source component is a Light Emitting Diode (LED).

29. The system of claim 27, wherein the LED components are arranged in a direct backlighting architecture.

30. The system of claim 27, wherein the LED components are arranged in an edge-lit backlighting architecture.

31. The system of claim 26, wherein each said light source component is a Cold Cathode Fluorescent Lamp (CCFL) tube.

32. The system of claim 26, wherein each said light source component is a Laser Diode (LD).

33. The system of claim 26, wherein the first processing means and the second processing means are integrated into one processor.

34. The system of claim 26, wherein the first processing means is a software tool run on a computer system.

35. The system of claim 26, wherein the second processing means is integrated into the display.

36. The system of claim 26, wherein the capture device is a two-dimensional (2D) camera.

37. The system of claim 26, wherein the capture device is a spot meter.

38. An electronic system for improving color and brightness uniformity of an Organic LED Display (OLED), said system comprising:

A display panel consisting of arrays of pixels, each pixel being an OLED component and characterized by a controllable digital RGB value;

an image generator unit for displaying a plurality of reference input images having pre-determined flat RGB pixel values across the display, for at least one signal level, for each of the plurality of light source components on the display;

an image capture and measurement unit to measure the display uniformity at a selected set of grid points on the display in response to said plurality of reference input images, the uniformity being characterized by at least one of the tristimulus values, luminance and chrominance components;

a first processing means to generate a display response function from the measured uniformity data, and compute a pixel correction grid data map that results in a constant uniformity value for all pixels at each said at least one signal level; and a second processing means to convert the pixel correction grid data map into a functional form represented by a set of coefficients, and applying the pixel correction functions to the input signal and the display for all pixel positions and color values.

* * * * *